US012665373B2

(12) United States Patent　　(10) Patent No.: US 12,665,373 B2
Sato et al.　　　　　　　　　　　(45) Date of Patent: Jun. 23, 2026

(54) FIBER LASER DEVICE

(71) Applicant: HAMAMATSU PHOTONICS K.K., Hamamatsu (JP)

(72) Inventors: Masatoshi Sato, Hamamatsu (JP); Hirotake Fukuoka, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 626 days.

(21) Appl. No.: 18/016,695

(22) PCT Filed: Jun. 2, 2021

(86) PCT No.: PCT/JP2021/021048
§ 371 (c)(1),
(2) Date: Jan. 18, 2023

(87) PCT Pub. No.: WO2022/038858
PCT Pub. Date: Feb. 24, 2022

(65) Prior Publication Data
US 2023/0275387 A1　　Aug. 31, 2023

(30) Foreign Application Priority Data
Aug. 21, 2020　　(JP) ................................. 2020-140193

(51) Int. Cl.
*H01S 3/067* (2006.01)
*H01S 3/10* (2006.01)
(Continued)

(52) U.S. Cl.
CPC ...... *H01S 3/06712* (2013.01); *H01S 3/06791* (2013.01); *H01S 3/10061* (2013.01);
(Continued)

(58) Field of Classification Search
CPC . H01S 3/06791; H01S 3/1112; H01S 3/06712
See application file for complete search history.

(56) References Cited

U.S. PATENT DOCUMENTS 10,254,475 B2 * 4/2019 Johansen ........... G02B 6/02333
10,367,328 B2 * 7/2019 Peng ................... H01S 3/08054
(Continued)

FOREIGN PATENT DOCUMENTS

CN　　101191975 A　　6/2008
CN　　204858262 U　　12/2015
(Continued)

OTHER PUBLICATIONS

Wang et al. "Cross-splicing method for compensating fiber birefringence in polarization-maintaining fiber ring laser mode locked by nonlinear polarization evolution", Applied Optics, vol. 55 No.21, Jul. 20, 2016 (Year: 2016).*
(Continued)

*Primary Examiner* — Tod T Van Roy
(74) *Attorney, Agent, or Firm* — Faegre Drinker Biddle & Reath LLP

(57) ABSTRACT
A fiber laser device includes a first optical fiber, a second optical fiber, and a third optical fiber configured by polarization maintaining fibers. The first optical fiber includes at least one first part and at least two second parts alternatively disposed with the first part. The first part and the second part adjacent to each other are connected to each other such that a fast axis of the first part coincides with a slow axis of the second part at a connection point. A total length of the first part is equal to a total length of the second parts. A mode field diameter of the first optical fiber is smaller than each of a mode field diameter of the second optical fiber and a mode field diameter of the third optical fiber.

13 Claims, 21 Drawing Sheets

(51) Int. Cl.
*H01S 3/1112* (2023.01)
*H01S 3/0941* (2006.01)

(52) U.S. Cl.
CPC ......... *H01S 3/1112* (2013.01); *H01S 3/06729*
(2013.01); *H01S 3/09415* (2013.01); *H01S*
*2301/02* (2013.01)

(56) References Cited

U.S. PATENT DOCUMENTS

| | | | | | |
|---|---|---|---|---|---|
| 2002/0057877 | A1 | 5/2002 | Sasaoka et al. | | |
| 2010/0067923 | A1* | 3/2010 | Arahira | ................. | G02F 1/3519 |
| | | | | | 398/188 |
| 2011/0157671 | A1 | 6/2011 | Koplow | | |
| 2012/0275477 | A1 | 11/2012 | Berendt et al. | | |
| 2019/0013639 | A1* | 1/2019 | Peng | .................... | H01S 3/1118 |
| 2020/0021077 | A1* | 1/2020 | Molter | ............... | H01S 3/06712 |
| 2023/0275387 | A1* | 8/2023 | Sato | ................... | H01S 3/10061 |
| | | | | | 372/6 |
| 2023/0327392 | A1* | 10/2023 | Baranov | .............. | H01S 3/1115 |
| | | | | | 372/6 |

FOREIGN PATENT DOCUMENTS

| | | | | | |
|---|---|---|---|---|---|
| CN | 106058620 | A | | 10/2016 | |
| CN | 109273972 | A | | 1/2019 | |
| CN | 110635347 | A * | 12/2019 | ......... | H01S 3/06733 |
| CN | 108321673 | B * | 9/2023 | ......... | H01S 3/06712 |
| CN | 117335252 | B * | 6/2024 | ......... | H01S 3/06712 |
| CN | 118487095 | B * | 11/2024 | ....... | H01S 3/094003 |
| EP | 3300191 | A1 | 3/2018 | | |
| JP | 2005-203430 | A | 7/2005 | | |
| JP | 2006-072029 | A | 3/2006 | | |
| JP | 2014-533428 | A | 12/2014 | | |
| JP | 2019535131 | A * | 12/2019 | .......... | H01S 3/1053 |
| JP | 2025104343 | A * | 7/2025 | | |
| KR | 2015-0137394 | A | 12/2015 | | |
| TW | 201521305 | A | 6/2015 | | |
| WO | WO-2013/025218 | A1 | 2/2013 | | |
| WO | WO-2019/023015 | A1 | 1/2019 | | |

OTHER PUBLICATIONS

Wu et al. "Nonlinear polarization evolution mode-locked YDFL based on all-pm fiber cavity", IEEE Photonics Journal, vol. 12, No. 2, Apr. 2020 (Year: 2020).*

International Preliminary Report on Patentability mailed Mar. 2, 2023 for PCT/JP2021/021048.

* cited by examiner (a)

(b)

(a)

(b)

(a)

(b)

(a)

(b)

FIBER LASER DEVICE

TECHNICAL FIELD

One aspect of the present disclosure relates to a fiber laser device.

BACKGROUND ART

Known as a fiber laser device is one that generates an ultrashort pulse laser by causing mode lock using the nonlinear effect of an optical fiber (see, for example, Patent Literature 1).

CITATION LIST

Patent Literature

Patent Literature 1: European Patent Application Publication No. 3300191

SUMMARY OF INVENTION

Technical Problem

In the fiber laser device as described above, it is necessary to use an optical fiber with a certain length or more in order to generate a sufficient nonlinear effect. Accordingly, the length of a resonator increases and it is difficult to increase the frequency of output light (high repetition rate). In addition, although the internal power density of the resonator needs to be sufficiently increased for self-starting mode lock, when the optical fiber is short, the internal power density for obtaining a sufficient nonlinear effect increases as compared with when the optical fiber is long, and high excitation power is required. In addition, the fiber laser device is required to output light with a satisfactory waveform.

An object of one aspect of the present disclosure is to provide a fiber laser device capable of outputting light with a satisfactory waveform and achieving high repetition rate and low excitation power.

Solution to Problem

A fiber laser device according to one aspect of the present disclosure includes: a first optical fiber configured by a polarization maintaining fiber; a second optical fiber configured by a polarization maintaining fiber and connected to one end of the first optical fiber; and a third optical fiber configured by a polarization maintaining fiber and connected to the other end of the first optical fiber, in which the first optical fiber includes at least one first part and at least two second parts alternatively disposed with the first part, the first part and the second part adjacent to each other are connected to each other such that a fast axis of the first part coincides with a slow axis of the second part at a connection point, a length of the first part is equal to a total length of the second parts, and a mode field diameter of the first optical fiber is smaller than each of a mode field diameter of the second optical fiber and a mode field diameter of the third optical fiber.

In this fiber laser device, the first optical fiber includes at least one first part and at least two second parts alternatively disposed with the first part. The first part and the second part adjacent to each other are connected to each other such that the fast axis of the first part coincides with the slow axis of the second part at the connection point. Mode lock can be caused by passing light through such a first optical fiber. In addition, the total length of the first part is equal to the total length of the second parts. As a result, the propagation velocity difference between the component propagating along the fast axis and the component propagating along the slow axis can be compensated. In addition, the first optical fiber includes at least one first part and at least two second parts. As a result, as compared with, for example, when the first optical fiber is made of only two fiber elements, it is possible to suppress output light waveform disturbance attributable to the interaction between the component propagating along the fast axis and the component propagating along the slow axis. As a result, light with a satisfactory waveform can be output. In addition, the mode field diameter of the first optical fiber is smaller than each of the mode field diameter of the second optical fiber and the mode field diameter of the third optical fiber, and the nonlinear effect of the first optical fiber is enhanced. As a result, the first optical fiber can be shortened and high repetition rate and low excitation power can be achieved. In this manner, according to this fiber laser device, light with a satisfactory waveform can be output and high repetition rate and low excitation power can be achieved.

At least one of the second optical fiber and the third optical fiber may be connected to the first optical fiber by fusion. In this case, the number of components can be reduced and manufacturing can be facilitated.

The second optical fiber may include a first part and a second part, the first part of the second optical fiber may be connected to the one end of the first optical fiber such that a fast axis of the first part of the second optical fiber coincides with a slow axis of the first optical fiber at a connection point, and the second part of the second optical fiber may be connected to the first part of the second optical fiber such that an angle between a fast axis of the second part of the second optical fiber and a fast axis of the first part of the second optical fiber is an angle other than 0 degrees or 90 degrees at a connection point. It is difficult to interconnect polarization maintaining fibers with mutually different mode field diameters such that the angle between the fast axes thereof is an angle other than 0 degrees or 90 degrees, which may cause a decrease in yield. In contrast, in this configuration, the first optical fiber and the second optical fiber with mutually different mode field diameters are connected such that the fast and slow axes thereof coincide (such that the angle between the fast axes thereof is 90 degrees). As a result, the connection between the first optical fiber and the second optical fiber can be facilitated, and the yield can be improved.

The third optical fiber may include a first part and a second part, the first part of the third optical fiber may be connected to the other end of the first optical fiber such that a fast axis of the first part of the third optical fiber coincides with a fast axis of the first optical fiber at a connection point, and the second part of the third optical fiber may be connected to the first part of the third optical fiber such that an angle between a fast axis of the second part of the third optical fiber and a fast axis of the first part of the third optical fiber is an angle other than 0 degrees or 90 degrees at a connection point. In this case, the connection between the first optical fiber and the third optical fiber can be facilitated, and the yield can be further improved.

A length of the first part of the second optical fiber may be equal to a length of the first part of the third optical fiber. In this case, regarding the first part of the second optical fiber and the first part of the third optical fiber, the propagation velocity difference between the component propagating along the fast axis and the component propagating along the slow axis can be compensated.

The second optical fiber may have a first part, the first part of the second optical fiber may be connected to the one end of the first optical fiber such that a fast axis of the first part of the second optical fiber coincides with a slow axis of the first optical fiber at a connection point, the third optical fiber may have a first part, the first part of the third optical fiber may be connected to the other end of the first optical fiber such that a fast axis of the first part of the third optical fiber coincides with a fast axis of the first optical fiber at a connection point, and a length of the first part of the second optical fiber may be equal to a length of the first part of the third optical fiber. In this case, the connection between the first optical fiber and the second optical fiber and the connection between the first optical fiber and the third optical fiber can be facilitated. In addition, regarding the first part of the second optical fiber and the first part of the third optical fiber, the propagation velocity difference between the component propagating along the fast axis and the component propagating along the slow axis can be compensated.

The fiber laser device according to one aspect of the present disclosure may further include a first bridge fiber configured by a polarization maintaining fiber and connected between the first optical fiber and the second optical fiber, in which a mode field diameter of the first bridge fiber may be larger than the mode field diameter of the first optical fiber and smaller than the mode field diameter of the second optical fiber. When polarization maintaining fibers with mutually different mode field diameters are interconnected, loss at a connection point is likely to occur. In contrast, in this configuration, the first bridge fiber larger in mode field diameter than the first optical fiber and smaller in mode field diameter than the second optical fiber is connected between the first optical fiber and the second optical fiber. As a result, loss at a connection point can be reduced.

The fiber laser device according to one aspect of the present disclosure may further include a second bridge fiber configured by a polarization maintaining fiber and connected between the first optical fiber and the third optical fiber, in which a mode field diameter of the second bridge fiber may be larger than the mode field diameter of the first optical fiber and smaller than the mode field diameter of the third optical fiber. In this case, loss at a connection point can be further reduced.

The first optical fiber may include an even number of the first and second parts in total, and a difference between an angle between a fast axis of the first bridge fiber and a fast axis of the first optical fiber at a connection point and an angle between a fast axis of the second bridge fiber and a fast axis of the first optical fiber at a connection point may be 90 degrees. In this case, regarding the first bridge fiber and the second bridge fiber, the propagation velocity difference between the component propagating along the fast axis and the component propagating along the slow axis can be compensated.

The first optical fiber may include an odd number of the first and second parts in total, and a difference between an angle between a fast axis of the first bridge fiber and a fast axis of the first optical fiber at a connection point and an angle between a fast axis of the second bridge fiber and a fast axis of the first optical fiber at a connection point may be 0 degrees. In this case, regarding the first bridge fiber and the second bridge fiber, the propagation velocity difference between the component propagating along the fast axis and the component propagating along the slow axis can be compensated.

A difference between an angle between a fast axis of the first bridge fiber and a fast axis of the second optical fiber at a connection point and an angle between a fast axis of the second bridge fiber and a fast axis of the third optical fiber at a connection point may be 0 degrees. In this case, regarding the second optical fiber and the third optical fiber, the propagation velocity difference between the component propagating along the fast axis and the component propagating along the slow axis can be compensated.

A length of the first bridge fiber may be equal to a length of the second bridge fiber. In this case, regarding the first bridge fiber and the second bridge fiber, the propagation velocity difference between the component propagating along the fast axis and the component propagating along the slow axis can be compensated.

The fiber laser device according to one aspect of the present disclosure may further include: a light source that outputs excitation light; and an optical fiber that absorbs the excitation light and emits laser light, in which the laser light may be guided by the first optical fiber, the second optical fiber, and the third optical fiber. In this case, light with a satisfactory waveform can be output and high repetition rate and low excitation power can be achieved.

Advantageous Effects of Invention

According to one aspect of the present disclosure, it is possible to provide a fiber laser device capable of outputting light with a satisfactory waveform and achieving high repetition rate and low excitation power.

DESCRIPTION OF EMBODIMENTS

Figure 1:
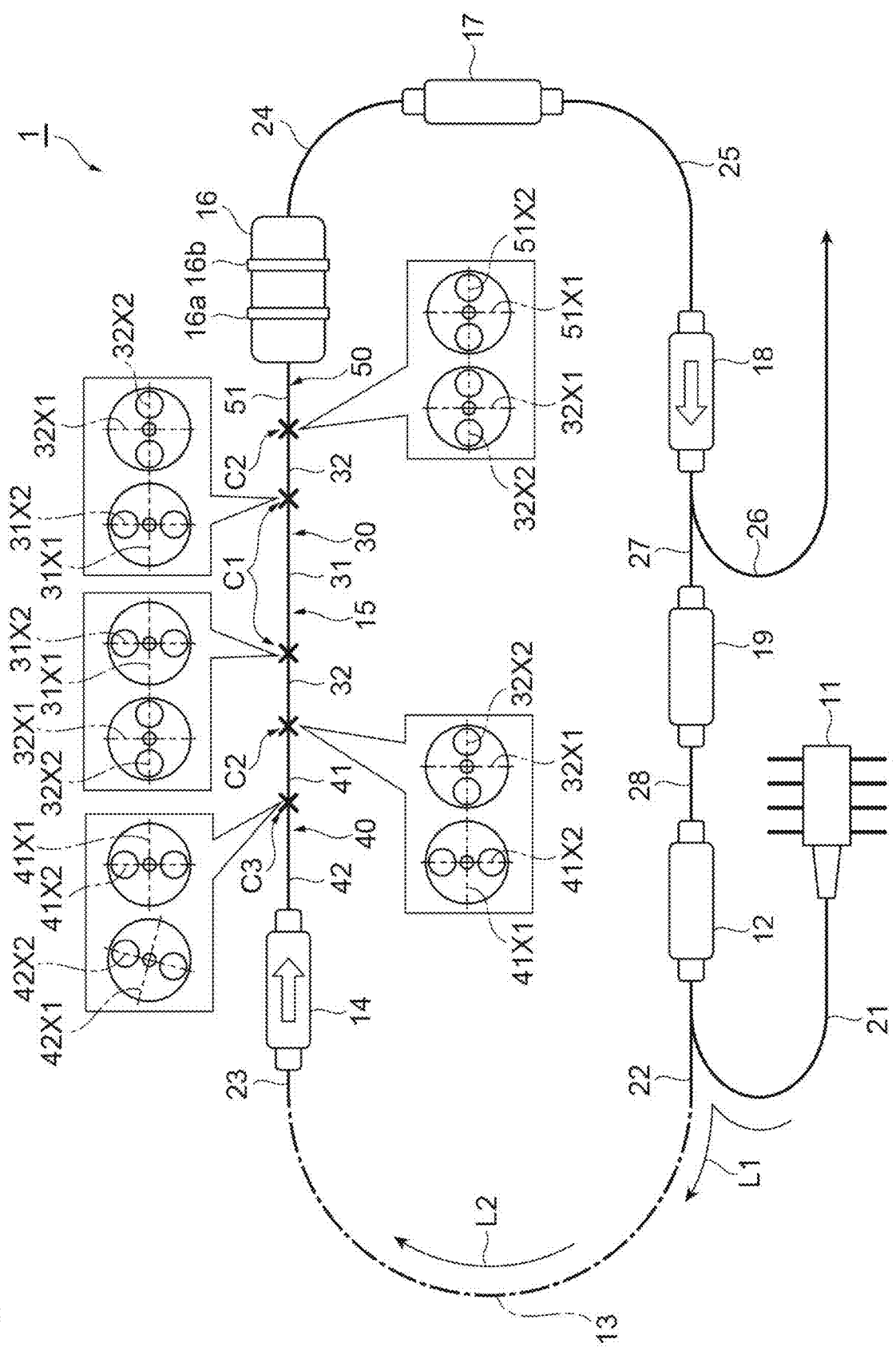
FIG. 1 is a configuration diagram of a fiber laser device according to an embodiment.

Hereinafter, one embodiment of the present disclosure will be described in detail with reference to the drawings. In the following description, the same reference numerals are used for the same or corresponding elements with redundant description omitted.

[Fiber Laser Device]

As illustrated in FIG. 1, a fiber laser device 1 includes a light source 11, a wavelength division multiplexing (WDM) coupler 12, a doped fiber 13, an isolator 14, a mode lock portion 15, a polarization controller 16, a polarizer 17, an output coupler 18, and an amplified spontaneous emission (ASE) filter 19. In addition, the fiber laser device 1 further includes a plurality of optical fibers 21 to 28 for interconnecting these elements. The mode lock portion 15 has a first optical fiber 30, a second optical fiber 40, and a third optical fiber 50.

Each of the doped fiber 13, the optical fibers 21 to 28, the first optical fiber 30, the second optical fiber 40, and the third optical fiber 50 is configured by a polarization maintaining (PM) fiber. The polarization maintaining fiber is an optical fiber in which the polarization plane maintaining property of transmitted light is enhanced by refractive index differentiation between a fast axis and a slow axis orthogonal to each other. Although each of the doped fiber 13, the optical fibers 21 to 28, the first optical fiber 30, the second optical fiber 40, and the third optical fiber 50 in this example is configured by a stress application-type polarization maintaining fiber using the photoelastic effect, each thereof may be configured by a structural polarization maintaining fiber having a non-axisymmetric core shape.

Figure 2:
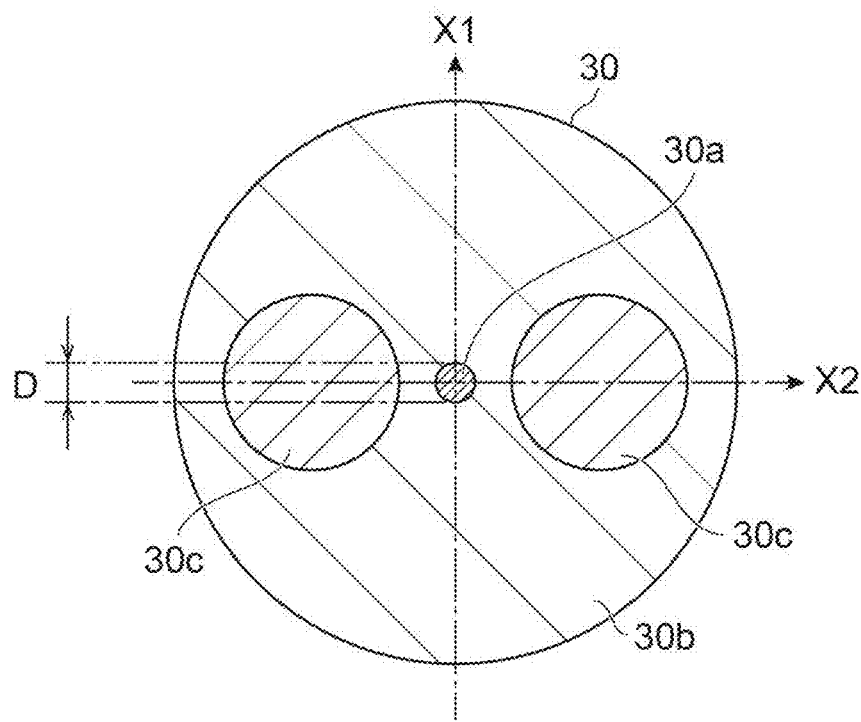
FIG. 2 is a cross-sectional view of a first optical fiber.

FIG. 2 is a cross-sectional view of the first optical fiber 30. The first optical fiber 30 has a fast axis X1 and a slow axis X2 orthogonal to each other. The first optical fiber 30 includes a core 30a, cladding 30b, and a pair of stress application materials 30c. The core 30a is positioned at the center of the first optical fiber 31. The refractive index of the core 30a is higher than the refractive index of the cladding 30b. The cladding 30b surrounds the core 30a. The pair of stress application materials 30c are disposed in the cladding 30b so as to be positioned on both sides of the core 30a on the slow axis X2.

In the first optical fiber 30, the core 30a is given birefringence by tensile stress application to the core 30a using the fact that the thermal shrinkage of the stress application material 30c is larger than the thermal shrinkage of the cladding 30b. Due to this refractive index difference, when light propagates in the first optical fiber 30, the component propagating along the fast axis X1 propagates faster than the component propagating along the slow axis X2. The doped fiber 13, the optical fibers 21 to 28, the second optical fiber 40, and the third optical fiber 50 have the same cross-sectional structure as the first optical fiber 30.

Referring to FIG. 1 again, the light source 11 outputs excitation light L1. The light source 11 is, for example, a laser diode that outputs laser light with a wavelength of 979 nm. The WDM coupler 12 reflects the excitation light L1 input from the light source 11 via the optical fiber 21 and outputs the light to the optical fiber 22 and transmits signal light L2 input via the optical fiber 28 and outputs the light to the optical fiber 22.

The doped fiber 13 absorbs the excitation light L1 input via the optical fiber 22 and emits laser light (signal light L2). The signal light L2 emitted from the doped fiber 13 is input to the isolator 14 via the optical fiber 23. The doped fiber 13 is, for example, an erbium-doped fiber (EDF) having a core doped with erbium (Er) and emits laser light with a wavelength in the 1.5 μm band. The doped fiber 13 may be an ytterbium-doped fiber having a core doped with ytterbium (Yb). In this case, the doped fiber 13 emits laser light with a wavelength in the 1.0 μm band.

The isolator 14 allows light to propagate in the forward direction from the doped fiber 13 toward the mode lock portion 15 and does not allow light to propagate in the direction opposite to the forward direction. The mode lock portion 15 has the second optical fiber 40, the first optical fiber 30, and the third optical fiber 50 in this order from the upstream side in the light propagation direction and guides the signal light L2 through these optical fibers. Details of the mode lock portion 15 will be described later.

The polarization controller 16 has a mechanism for adjusting the polarization state of the signal light L2 output from the mode lock portion 15. The polarization controller 16 is configured to include, for example, a λ/4 wave plate 16a and a λ/2 wave plate 16b, which are rotatably held. The signal light L2 output from the polarization controller 16 is input to the polarizer 17 via the optical fiber 24. The polarizer 17 transmits the component propagating along the slow axis of the signal light L2 propagating in the optical fiber 24 and reflects the component propagating along the fast axis of the signal light L2 propagating in the optical fiber 24.

The output coupler 18 divides the signal light L2 input from the polarizer 17 via the optical fiber 25 at a predetermined ratio, outputs part of the signal light L2 to the optical fiber 26, and outputs the rest to the optical fiber 27. For example, the output coupler 18 outputs 25% of the signal light L2 to the optical fiber 26 and outputs the remaining 75% to the optical fiber 27. The signal light L2 output to the optical fiber 26 is, for example, output to the outside as output light. The output coupler 18 may be provided with an isolator such that return light from the outside entering via the optical fiber 26 does not return into a resonator. In this case, oscillation in the resonator becoming unstable due to the return light can be suppressed.

The ASE filter 19 transmits only components within a predetermined wavelength range of the signal light L2 propagating through the optical fiber 27 and outputs the components to the optical fiber 28. In this example, the ASE filter 19 transmits only light with a wavelength of 1545 nm or more. As a result, oscillation in the wavelength region near 1530 nm can be suppressed.

As described above, the fiber laser device 1 includes a full polarization maintaining fiber resonator (oscillator) that is a ring-shaped resonator configured by a polarization maintaining fiber. In the fiber laser device 1, by causing mode lock in the mode lock portion 15, an ultrashort pulse laser with a pulse width of, for example, 50 femtoseconds to 10 picoseconds is output.

[Mode Lock Portion]

Figure 3:
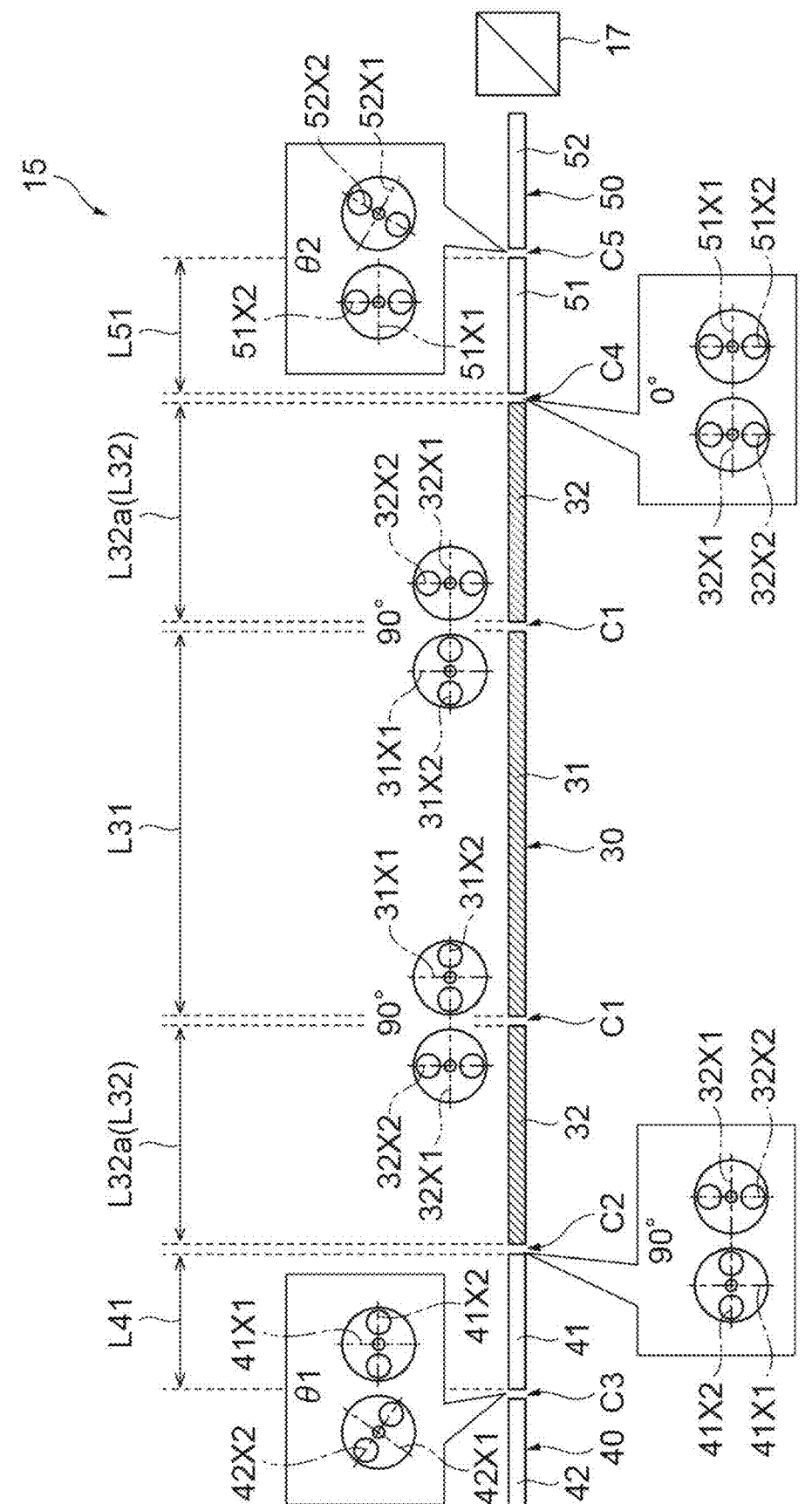
FIG. 3 is a schematic diagram of a mode lock portion.

As illustrated in FIGS. 1 and 3, the mode lock portion 15 has the first optical fiber 30, the second optical fiber 40 connected to one end of the first optical fiber 30, and the third optical fiber 50 connected to the other end of the first optical fiber 30. As will be described later, the configurations of the mode lock portion 15 illustrated in FIG. 1 and the mode lock portion 15 illustrated in FIG. 3 are slightly different from each other.

The first optical fiber 30 has a first part 31 and two second parts 32. Each of the first part 31 and the two second parts 32 is configured by a polarization maintaining fiber. The first part 31 and the two second parts 32 are alternatively disposed. The two second parts 32 are connected to both ends of the first part 31, respectively.

Each second part 32 is connected to the first part 31 such that a fast axis 32X1 of the second part 32 coincides with a slow axis 31X2 of the first part 31 at a connection point C1. In other words, the angle between the fast axis 32X1 of the second part 32 and a fast axis 31X1 of the first part 31 at the connection point C1 between each second part 32 and the first part 31 is 90 degrees. Each second part 32 is directly connected to the first part 31 by, for example, fusion. It should be noted that although inter-fiber gaps are illustrated in FIG. 3, the actual fibers are gaplessly interconnected. "Fast axis coinciding with slow axis (or fast axis)" means that the fast axis coincides with the slow axis (is along the slow axis) when viewed in the light propagation direction (fiber extension direction).

A total length L31 of the first part 31 is equal to a total length L32 of the second part 32. The total lengths L31 and L32 are lengths along the extension direction of the first optical fiber 30 (light propagation direction). The total length L32 of the second parts 32 is the sum of respective lengths L32*a* of the second parts 32. "The total length L31 of the first part 31 being equal to the total length L32 of the second part 32" includes when there is an allowable slight error between the total length L31 and the total length L32. The size of the allowable error is set depending on, for example, whether mode lock occurs. The allowable error is, for example, the beat length (approximately 2 mm) or less. The beat length is a birefringence magnitude index and is the distance at which the phase difference between light propagating on a fast axis and light propagating on a slow axis is 2π. Alternatively, the allowable error is 5 mm or less. The same applies to a length L41 of a first part 41 of the second optical fiber 40 and a length L51 of a first part 51 of the third optical fiber 50 and a length L60 of a first bridge fiber 60 and a length L70 of a second bridge fiber 70, which will be described later.

The second optical fiber 40 has the first part 41 and a second part 42. The first part 41 is connected to the second part 32 of the first optical fiber 30 such that a fast axis 41X1 of the first part 41 coincides with a slow axis 32X2 of the second part 32 at a connection point C2. In other words, the angle between the fast axis 41X1 of the first part 41 and the fast axis 32X1 of the second part 32 at the connection point C2 between the first part 41 and the second part 32 is 90 degrees. The first part 41 is directly connected to the second part 32 by, for example, fusion.

The second part 42 is connected to one end of the first part 41 such that the angle between a fast axis 42X1 of the second part 42 and the fast axis 41X1 of the first part 41 is an angle θ1 other than 0 degrees or 90 degrees at a connection point C3. In other words, the angle θ1 is neither 0 degrees nor 90 degrees. The angle θ1 is an angle other than 45 degrees. The angle θ1 can be, for example, experimentally set such that mode lock occurs as will be described later. The angle θ1 is an angle when viewed in the light propagation direction (extension direction of the first optical fiber 30 and the second optical fiber 40). The same applies to an angle θ2, which will be described later. The second part 42 is directly connected to the first part 41 by, for example, fusion. The other end of the second part 42 is connected to the isolator 14 described above.

In the mode lock portion 15 illustrated in FIG. 3, the third optical fiber 50 has the first part 51 and a second part 52. The first part 51 is connected to the second part 32 of the first optical fiber 30 such that a fast axis 51X1 of the first part 51 coincides with the fast axis 32X1 of the second part 32 at a connection point C4. In other words, the angle between the fast axis 51X1 of the first part 51 and the fast axis 32X1 of the second part 32 at the connection point C4 between the first part 51 and the second part 32 is 0 degrees. The angle between the fast axis 51X1 of the first part 51 and the fast axis 32X1 of the second part 32 at the connection point C4 differs by 90 degrees from the angle between the fast axis 41X1 of the first part 41 of the second optical fiber 40 and the fast axis 32X1 of the second part 32 at the connection point C2. The first part 51 is directly connected to the second part 32 by, for example, fusion.

The second part 52 is connected to one end of the first part 51 such that the angle between a fast axis 52X1 of the second part 52 and the fast axis 51X1 of the first part 51 is the angle θ2 other than 0 degrees or 90 degrees at a connection point C5. In other words, the angle θ2 is neither 0 degrees nor 90 degrees. The angle θ2 is an angle other than 45 degrees. For example, the angle θ2 is an angle obtained by adding 90 degrees to the angle θ1. One end of the second part 52 is directly connected to the first part 51 by, for example, fusion. The other end of the second part 52 is connected to the polarizer 17 described above.

The length L41 of the first part 41 of the second optical fiber 40 is equal to the length L51 of the first part 51 of the third optical fiber 50. The lengths L41 and L51 are lengths along the extension direction of the second optical fiber 40 and the third optical fiber 50 (light propagation direction).

In the mode lock portion 15 illustrated in FIG. 1, the third optical fiber 50 has only the first part 51. One end of the first part 51 is connected to the second part 32, and the other end of the first part 51 is connected to the polarization controller 16 described above. In the mode lock portion 15 illustrated in FIG. 3, the polarization state of light is adjusted by the angle between the fast axis 51X1 of the first part 51 and the fast axis 52X1 of the second part 52 at the connection point C5 being the angle θ2. In contrast, in the mode lock portion 15 illustrated in FIG. 1, the polarization state of light is adjusted as in the mode lock portion 15 illustrated in FIG. 3 by the polarization controller 16 including a rotatable wave plate. In this manner, the second part 52 of the third optical fiber 50 may be replaced with an adjustment mechanism using a wave plate.

The mode field diameter (MFD) of the first optical fiber 30 is smaller than each of the MFD of the second optical fiber 40 and the MFD of the third optical fiber 50. The mode field diameter is an index representing the extent to which light propagating in an optical fiber leaks out from the core to the cladding. For example, the mode field diameter can be measured by causing light to be incident on one end of the fiber and acquiring an image of the light emitted from the other end. The MFD of the first optical fiber 30 is, for example, 2 μm to 4 μm. The MFDs of the second optical fiber 40 and the third optical fiber 50 are, for example, 4 μm to 10 μm. The MFD is uniform throughout the first optical fiber 30. The same applies to the second optical fiber 40 and the third optical fiber 50. In a polarization maintaining fiber, the nonlinear effect increases as the MFD decreases. In other words, the first optical fiber 30 is configured by a highly nonlinear fiber higher in nonlinear effect than the polarization maintaining fibers configuring the second optical fiber 40 and the third optical fiber 50. It should be noted that although the core diameter of the first optical fiber 30 may be smaller than each of the core diameter of the second optical fiber 40 and the core diameter of the third optical fiber 50, the core diameter of the first optical fiber 30 may be equal to or greater than each of the core diameter of the second optical fiber 40 and the core diameter of the third optical fiber 50. The core diameter of the first optical fiber 30 is a diameter D of the core 30a of the polarization maintaining fiber configuring the first optical fiber 30 as illustrated in FIG. 2. The core diameter of the second optical fiber 40 and the third optical fiber 50 is the diameter D of the core 30a of the polarization maintaining fiber configuring the second optical fiber 40 and the third optical fiber 50.

FUNCTION AND EFFECT

As described above, in the fiber laser device 1, the first optical fiber 30 has the first part 31 and the two second parts 32 alternatively disposed with the first part 31. The first part 31 and the second part 32 adjacent to each other are connected to each other such that the fast axis 31X1 of the first part 31 coincides with the slow axis 32X2 of the second part 32 at the connection point C1. Mode lock can be caused by passing light through the first optical fiber 30 and providing a necessary optical element (for example, the polarizer 17) in the subsequent position.

That is, the angle between the fast axis 42X1 of the second part 42 of the second optical fiber 40 and the fast axis 41X1 of the first part 41 of the second optical fiber 40 at the connection point C3 is the angle θ1 other than 0 degrees or 90 degrees. As a result, when the light propagating through the second part 42 is incident on the first part 41, the light is divided into a component propagating along the fast axis 41X1 of the first part 41 and a component propagating along a slow axis 41X2 of the first part 41. Since the angle θ1 is set to an angle other than 45 degrees, the intensity of the component propagating along the fast axis 41X1 differs from the intensity of the component propagating along the slow axis 41X2. The nonlinear effect given to the light propagating in the polarization maintaining fiber increases as the intensity of the light increases. Accordingly, nonlinear effects of different magnitudes occur between the component propagating along the fast axis 41X1 and the component propagating along the slow axis 41X2. The light output from the first part 41 is guided by the first optical fiber 30 and the first part 51 of the third optical fiber 50 and reaches the second part 52 of the third optical fiber 50. During this light guiding as well, the component propagating along the fast axis and the component propagating along the slow axis receive nonlinear effects of different magnitudes as in propagating in the first part 41. The angle between the fast axis 51X1 of the first part 51 and the fast axis 52X1 of the second part 52 at the connection point C5 is the angle θ2 other than 0 degrees or 90 degrees. Alternatively, in the mode lock portion 15 illustrated in FIG. 1, the polarization state of light is similarly adjusted by the polarization controller 16. As a result, when light is incident from the first part 51 to the second part 52, the components propagating on the respective axes are mutually synthesized and the difference in nonlinear effect leads to a phase difference. The phase difference varies with the intensity level, and thus mode lock can be caused by increasing the transmittance of high-intensity light and decreasing the transmittance of low-intensity light.

Here, in the event of light propagation in the polarization maintaining fiber, the refractive index difference causes a propagation velocity difference between the component propagating along the fast axis and the component propagating along the slow axis. In this regard, in the fiber laser device 1, the total length L31 of the first part 31 is equal to the total length L32 of the second parts 32. In other words, the lengths of the first part 31 and the second part 32 are set such that the distance of propagation along the fast axis and the length of propagation along the slow axis are equal to each other. As a result, the propagation velocity difference between the component propagating along the fast axis and the component propagating along the slow axis can be compensated.

In addition, in the fiber laser device 1, the first optical fiber 30 has the first part 31 and the two second parts 32. As a result, as compared with, for example, when the first optical fiber 30 is made of only two fiber elements, it is possible to suppress output light waveform disturbance attributable to the interaction between the component propagating along the fast axis and the component propagating along the slow axis. As a result, light with a satisfactory waveform can be output.

That is, mode lock can be caused even when the first optical fiber 30 is made of only two fiber elements connected such that the angle between the fast axes thereof is 90 degrees. However, output light waveform disturbance may result from the mutual interaction (cross-phase modulation) between the rear part of the component propagating ahead in the fiber element and the front part of the component propagating later in the fiber element. In contrast, in the fiber laser device 1, the first optical fiber 30 has the first part 31 and the two second parts 32. As a result, the distance of occurrence of a propagation velocity difference can be shortened, and waveform disturbance attributable to a propagation velocity difference can be suppressed. In other words, the front part of the first part 31 compensates for the time difference caused at the second part 32 on the upstream side, and the second part 32 on the downstream side compensates for the time difference caused at the rear part of the first part 31. As a result, output light waveform disturbance can be suppressed and light with a satisfactory waveform can be output (cross-splicing method).

In addition, in the fiber laser device 1, the MFD of the first optical fiber 30 is smaller than each of the MFD of the second optical fiber 40 and the MFD of the third optical fiber 50, and the nonlinear effect of the first optical fiber 30 is enhanced. As a result, the first optical fiber 30 can be shortened and a high repetition rate can be achieved. In addition, the excitation power required for self-starting mode lock can be reduced. From the above, according to the fiber laser device 1, light with a satisfactory waveform can be output and high repetition rate and low excitation power can be achieved. In addition, although a fiber laser device using a semiconductor saturable absorber mirror (SESAM) may be problematic as the semiconductor saturable absorber mirror is prone to optical damage and varies considerably in terms of service life, the fiber laser device 1 uses no semiconductor saturable absorber mirrors and thus such a situation can be avoided.

The second optical fiber 40 and the third optical fiber 50 are connected to the first optical fiber 30 by fusion. As a result, the number of components can be reduced and manufacturing can be facilitated as compared with when coupling is performed using an optical element (such as a lens) on a space. Normally, when polarization maintaining fibers with mutually different MFDs are interconnected by fusion, loss at a connection point is likely to result from the difference in MFD and the difference in the ease of deformation during heating. Such loss may lead to instability such as noise and distortion in light circulating in a resonator. In the fiber laser device 1, in view of such a point, the second optical fiber 40 and the third optical fiber 50 are connected to the first optical fiber 30 by fusion to reduce the number of components and facilitate manufacturing.

In addition, in the fiber laser device 1, the first part 41 of the second optical fiber 40 is connected to the second part 32 of the first optical fiber 30 such that the fast axis 41X1 of the first part 41 coincides with the slow axis 32X2 of the second part 32 at the connection point C2, and the second part 42 of the second optical fiber 40 is connected to the first part 41 such that the angle θ1 between the fast axis 42X1 of the second part 42 and the fast axis 41X1 of the first part 41 is an angle other than 0 degrees or 90 degrees at the connection point C3. It is difficult to interconnect polarization maintaining fibers with mutually different MFDs such that the angle between the fast axes thereof is an angle other than 0 degrees or 90 degrees, which may cause a decrease in yield. This point becomes particularly conspicuous when polarization maintaining fibers with mutually different MFDs are interconnected by fusion. This is because fusion needs to be performed with stress symmetry unobtainable and deformation during heating is different due to the difference in dopant and structure when the angle between the fast axes is an angle other than 0 degrees or 90 degrees. For example, when the angle between the fast axes is an angle other than 0 degrees or 90 degrees, the probability of success is lower than when the angle between the fast axes is 0 degrees or 90 degrees, and the yield is 50% or less. In contrast, in the fiber laser device 1, the first optical fiber 30 and the second optical fiber 40 with mutually different MFDs are connected such that the fast and slow axes thereof coincide (such that the angle between the fast axes thereof is 90 degrees). As a result, the connection between the first optical fiber 30 and the second optical fiber 40 can be facilitated, and the yield can be improved. The action and effect of being capable of yield improvement become particularly conspicuous when the first optical fiber 30 and the second optical fiber 40 are connected by fusion as in the present embodiment. It should be noted that in interconnecting polarization maintaining fibers with the same MFD such as the connection points C3 and C5, the probability of success is high and the yield is almost 100% even if the angle between the fast axes is an angle other than 0 degrees or 90 degrees.

The first part 51 of the third optical fiber 50 is connected to the second part 32 of the first optical fiber 30 such that the fast axis 51X1 of the first part 51 coincides with the fast axis 32X1 of the second part 32 at the connection point C4, and the second part 52 of the third optical fiber 50 is connected to the first part 51 such that the angle θ2 between the fast axis 52X1 of the second part 52 and the fast axis 51X1 of the first part 51 is an angle other than 0 degrees or 90 degrees at the connection point C5. As a result, the connection between the first optical fiber 30 and the third optical fiber 50 can be facilitated, and the yield can be further improved. The action and effect of being capable of yield improvement become particularly conspicuous when the first optical fiber 30 and the third optical fiber 50 are connected by fusion as in the present embodiment.

The length L41 of the first part 41 of the second optical fiber 40 is equal to the length L51 of the first part 51 of the third optical fiber 50. As a result, regarding the first part 41 and the first part 51, the propagation velocity difference between the component propagating along the fast axis and the component propagating along the slow axis can be compensated.

EXAMPLE

Mode lock oscillation was performed by the fiber laser device 1 illustrated in FIG. 1. The fiber laser device 1 was configured to output laser light with a wavelength in the 1.5 μm band. The MFD of the first optical fiber 30 was approximately 4.9 μm. The length of the first optical fiber 30 was approximately 2 m. The MFDs of the second optical fiber 40 and the third optical fiber 50 were approximately 10.1 μm. The dispersion value of the entire resonator was −0.014 ps². The excitation power at self-starting mode lock (output power of the light source 11) was approximately 105 mW.

Figure 4:
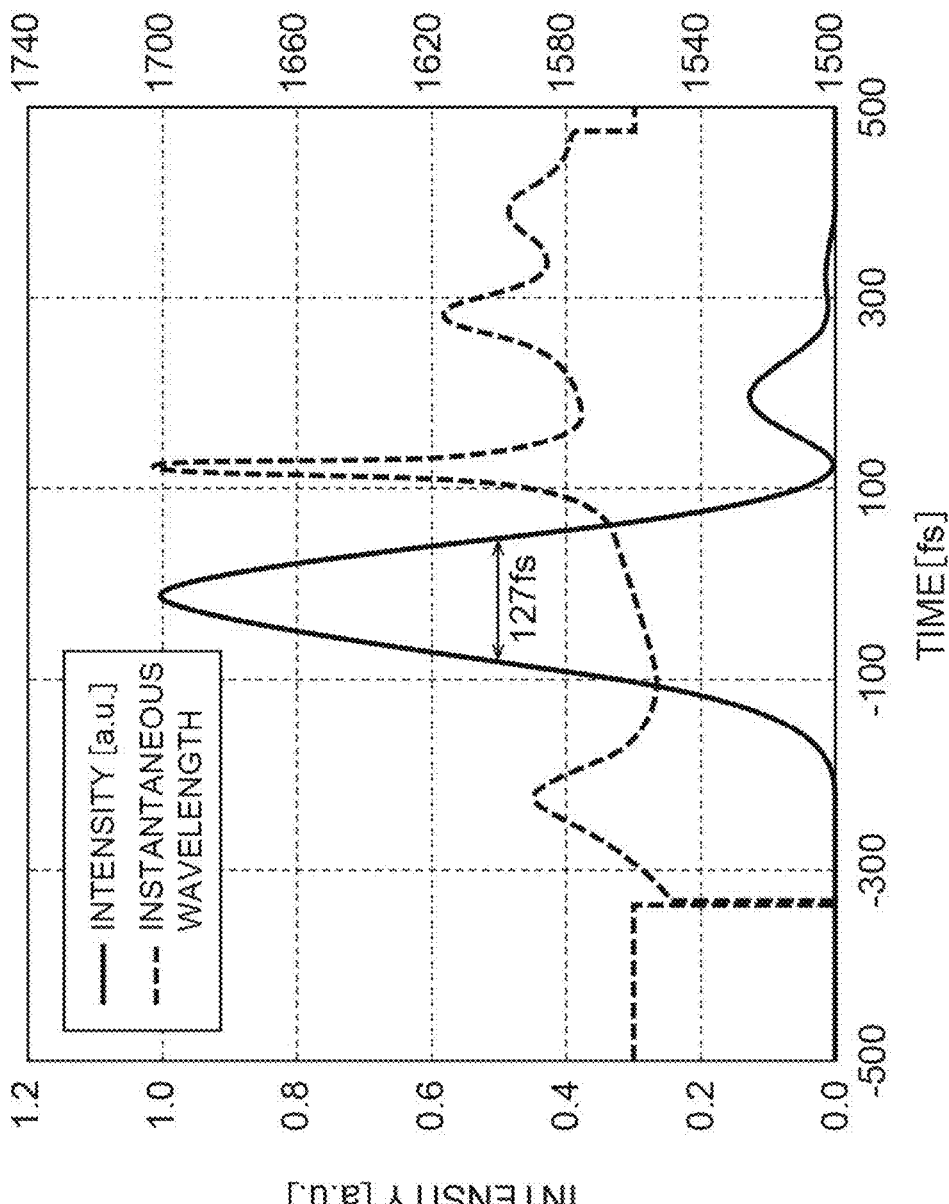
FIG. 4 is a graph illustrating a pulse waveform and an instantaneous wavelength.
Figure 5:
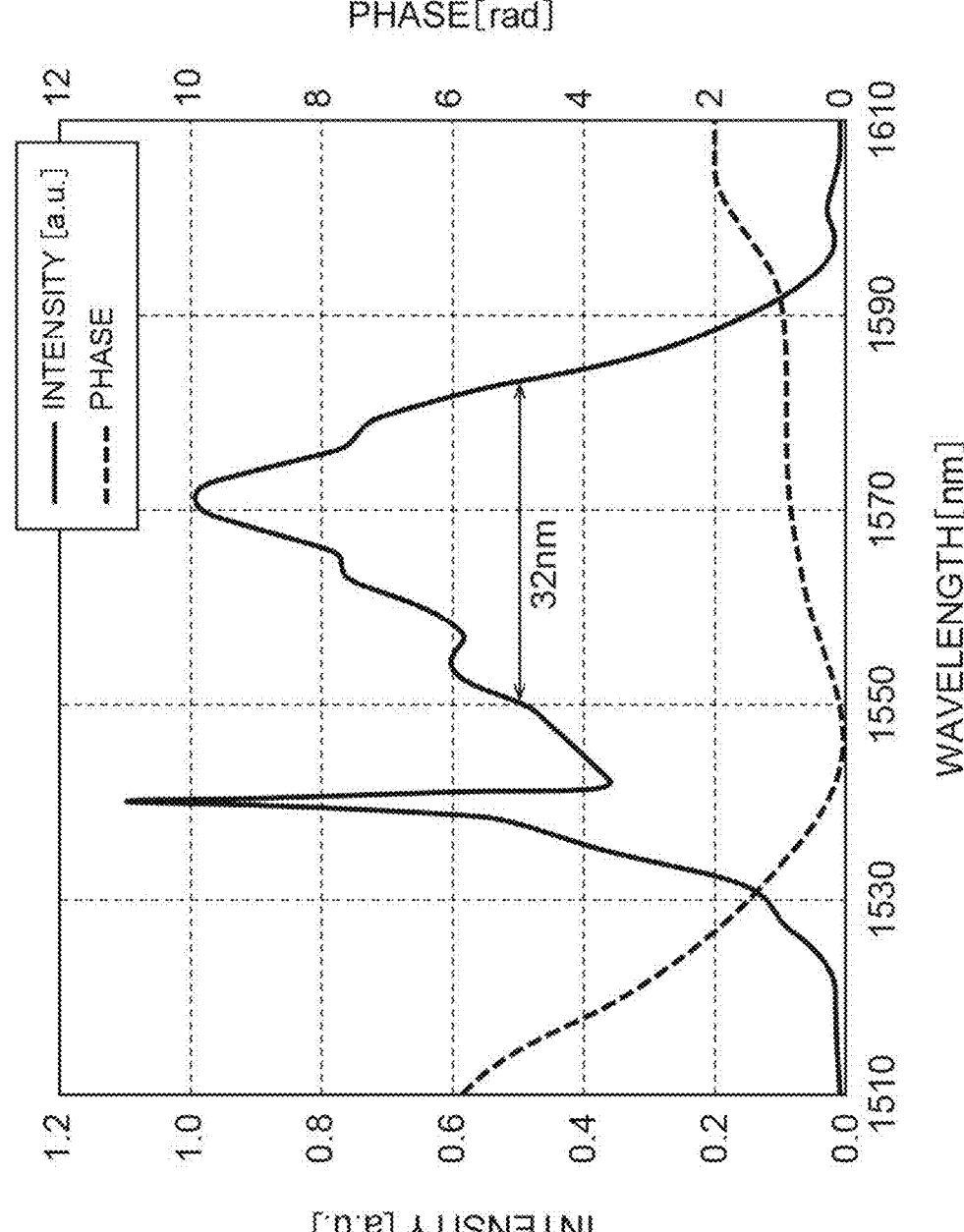
FIG. 5 is a graph illustrating a spectral waveform and a phase.

The pulse width of the output light was measured by frequency-resolved optical gating (FROG) method. FIG. 4 is a graph illustrating a pulse waveform and an instantaneous wavelength. FIG. 5 is a graph illustrating a spectral waveform and a phase. As illustrated in FIG. 4, an ultrashort pulse wave with a satisfactory waveform was output. The pulse width was 127 fs. As illustrated in FIG. 5, the spectral width was 32 nm, and a sufficient spectral width was obtained. It can be seen that the pulse width is satisfactorily compressed as the phase is low in the wavelength region where a spectral peak is formed.

Figure 6:
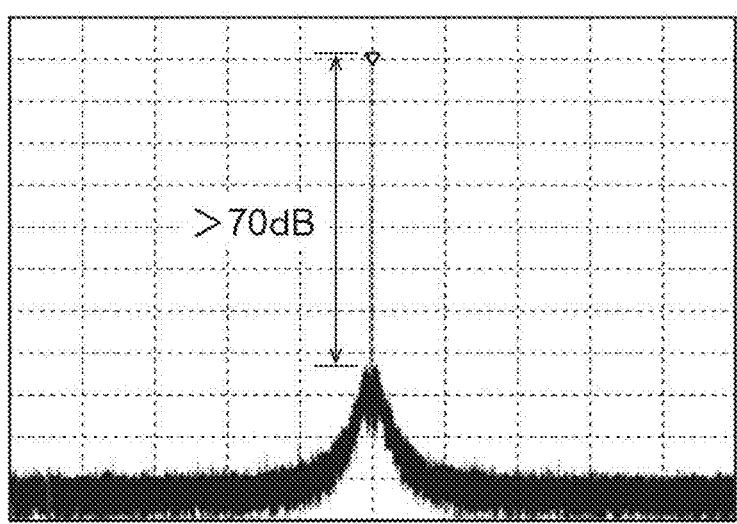
FIGS. 6(*a*) and 6(*b*) are graphs illustrating frequency spectra.
Figure 6:
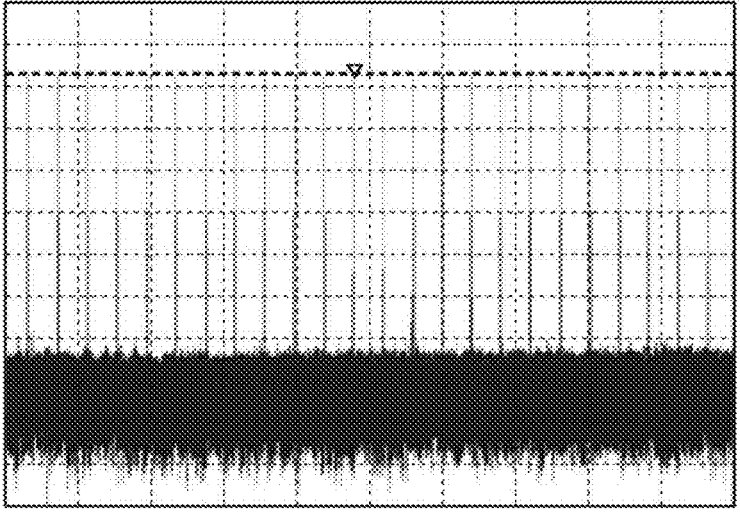

The frequency spectrum of the output light was measured using a high-frequency spectrum analyzer. FIGS. 6(a) and 6(b) are graphs illustrating frequency spectra. The scale interval of the horizontal axis is 100 kHz in FIG. 6(a) and 100 MHz in FIG. 6(b). In both graphs, the scale interval of the vertical axis is 10 dB. FIGS. 6(a) and 6(b) are graphs illustrating frequency spectra. The repetition frequency of the output light was 40.6 MHz. As illustrated in FIG. 6(a), the S/N ratio of the frequency spectrum of the output light was 70 dB or more. As illustrated in FIG. 6(b), the peak heights were uniform and sufficient frequency stability was obtained even when the band was widened to 1 GHz.

First Modification Example

Figure 7:
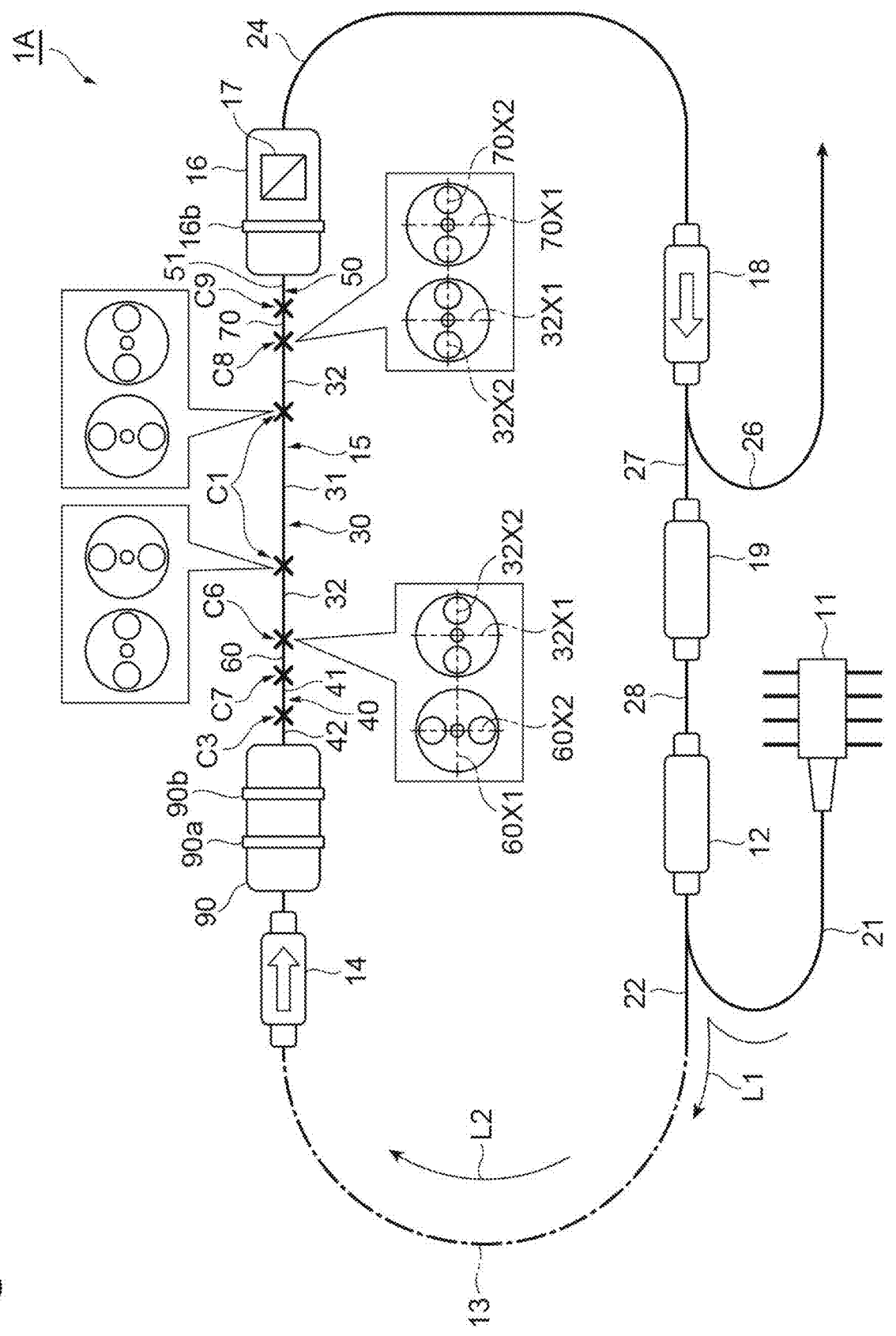
FIG. 7 is a configuration diagram of a fiber laser device of a first modification example.
Figure 8:
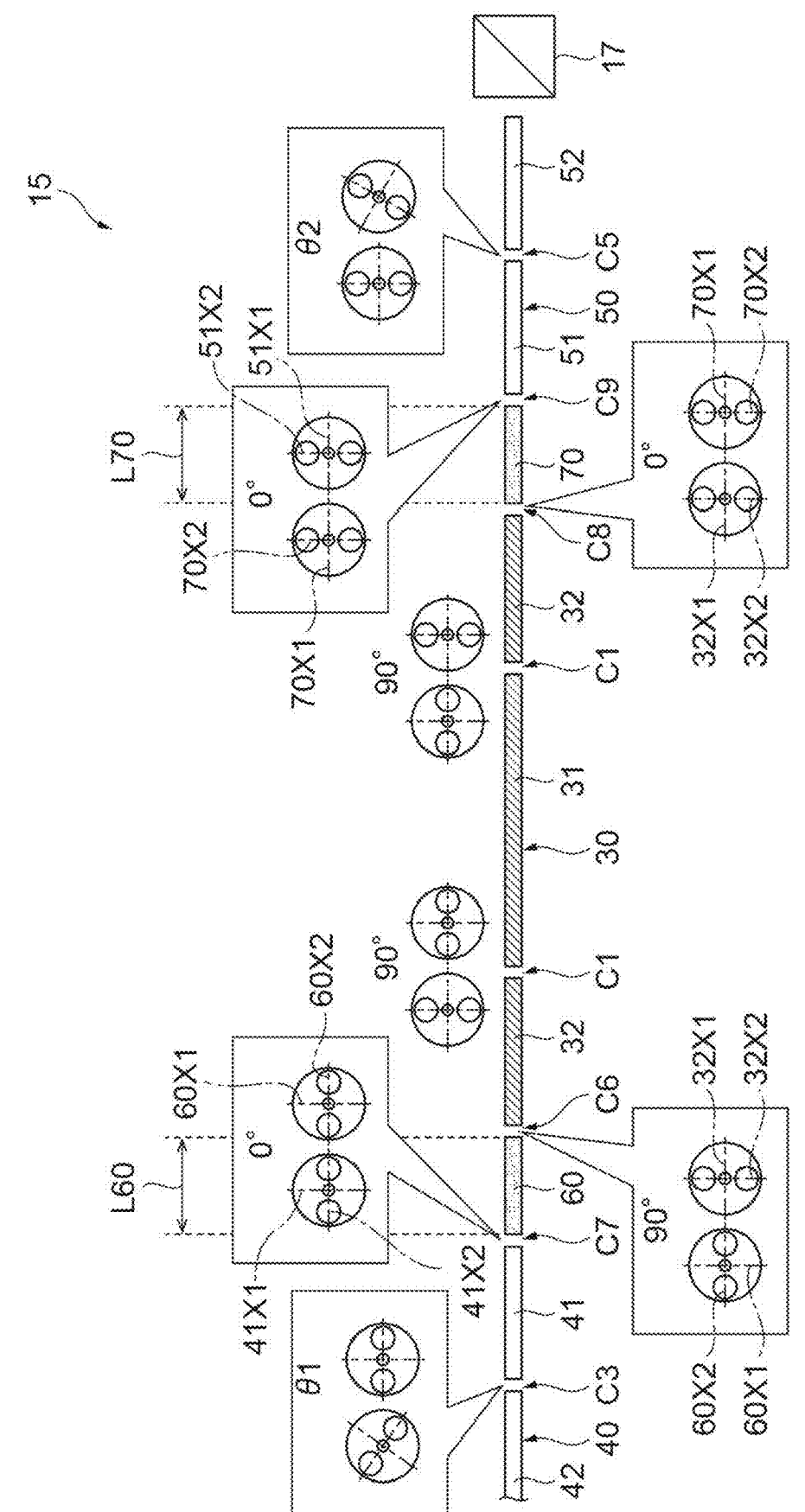
FIG. 8 is a schematic diagram of a mode lock portion of the first modification example.

In a fiber laser device 1A of a first modification example illustrated in FIGS. 7 and 8, the mode lock portion 15 further includes the first bridge fiber 60 and the second bridge fiber 70.

The first bridge fiber 60 is configured by a polarization maintaining fiber and is connected between the second part 32 of the first optical fiber 30 and the first part 41 of the second optical fiber 40. One end of the first bridge fiber 60 is connected to the second part 32 such that a fast axis 60X1 of the first bridge fiber 60 coincides with the slow axis 32X2 of the second part 32 at a connection point C6. The other end of the first bridge fiber 60 is connected to the first part 41 such that the fast axis 60X1 of the first bridge fiber 60 coincides with the fast axis 41X1 of the first part 41 at a connection point C7. The first bridge fiber 60 is directly connected to the second part 32 and the first part 41 by, for example, fusion.

The second bridge fiber 70 is configured by a polarization maintaining fiber and is connected between the second part 32 of the first optical fiber 30 and the first part 51 of the third optical fiber 50. One end of the second bridge fiber 70 is connected to the second part 32 such that a fast axis 70X1 of the second bridge fiber 70 coincides with the fast axis 32X1 of the second part 32 at a connection point C8. The other end of the second bridge fiber 70 is connected to the first part 51 such that the fast axis 70X1 of the second bridge fiber 70 coincides with the fast axis 51X1 of the first part 51 at a connection point C9. The second bridge fiber 70 is directly connected to the second part 32 and the first part 51 by, for example, fusion.

The length L60 of the first bridge fiber 60 is equal to the length L70 of the second bridge fiber 70. The lengths L60 and L70 are lengths along the extension direction of the first bridge fiber 60 and the second bridge fiber 70 (light propagation direction).

The MFD of the first bridge fiber 60 is larger than the MFD of the first optical fiber 30 and smaller than the MFD of the second optical fiber 40. The MFD of the second bridge fiber 70 is larger than the MFD of the first optical fiber 30 and smaller than the MFD of the third optical fiber 50. The MFD of the first bridge fiber 60 is, for example, equal to the MFD of the second bridge fiber 70. The MFDs of the first bridge fiber 60 and the second bridge fiber 70 are, for example, 4 μm to 5 μm.

In the first modification example, a polarization controller 90 is provided between the isolator 14 and the mode lock portion 15. The polarization controller 90 has a mechanism for adjusting the polarization state of the signal light L2 input to the mode lock portion 15. The polarization controller 90 is configured to include, for example, a λ/4 wave plate 90a and a λ/2 wave plate 90b, which are rotatably held. In the example illustrated in FIG. 7, the polarization controller 16 and the polarizer 17 are integrally configured as one element. The polarization controller 16 includes only the λ/2 wave plate 16b.

According to the first modification example as well as the above embodiment, light with a satisfactory waveform can be output and high repetition rate and low excitation power can be achieved. In addition, in the first modification example, the first bridge fiber 60 larger in MFD than the first optical fiber 30 and smaller in MFD than the second optical fiber 40 is connected between the first optical fiber 30 and the second optical fiber 40. As a result, the loss at the connection point between the first optical fiber 30 and the second optical fiber 40 can be reduced.

The second bridge fiber 70 larger in MFD than the first optical fiber 30 and smaller in MFD than the third optical fiber 50 is connected between the first optical fiber 30 and the third optical fiber 50. As a result, the loss at the connection point can be further reduced.

The first bridge fiber 60 is connected to the second part 32 of the first optical fiber 30 such that the fast axis 60X1 of the first bridge fiber 60 coincides with the slow axis 32X2 of the second part 32 at the connection point C6, and the second bridge fiber 70 is connected to the second part 32 such that the fast axis 70X1 of the second bridge fiber 70 coincides with the fast axis 32X1 of the second part 32 at the connection point C8. The length L60 of the first bridge fiber 60 is equal to the length L70 of the second bridge fiber 70. As a result, regarding the first bridge fiber 60 and the second bridge fiber 70, the propagation velocity difference between the component propagating along the fast axis and the component propagating along the slow axis can be compensated.

Figure 9:
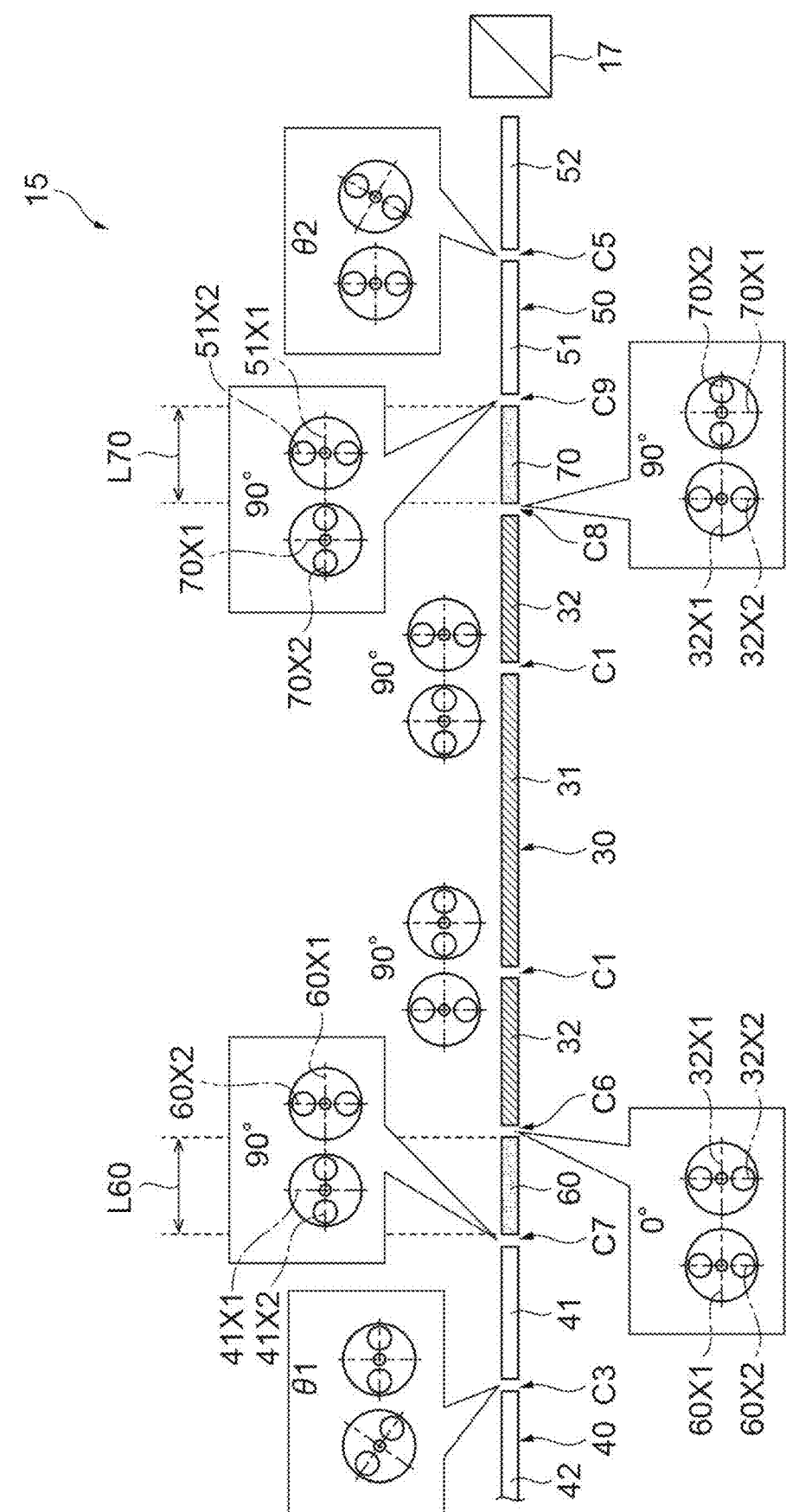
FIG. 9 is a diagram for describing how a bridge fiber is connected.

The first modification example may be configured as illustrated in FIG. 9. In this example, the fast axis 60X1 of the first bridge fiber 60 coincides with the fast axis 32X1 of the second part 32 at the connection point C6, and the fast axis 60X1 of the first bridge fiber 60 coincides with the slow axis 41X2 of the first part 41 at the connection point C7. The fast axis 70X1 of the second bridge fiber 70 coincides with the slow axis 32X2 of the second part 32 at the connection point C8, and the fast axis 70X1 of the second bridge fiber 70 coincides with a slow axis 51X2 of the first part 51 at the connection point C9. Also in this case, the propagation velocity difference between the component propagating along the fast axis and the component propagating along the slow axis can be compensated. In other words, when the first optical fiber 30 has an odd number of first parts 31 and second parts 32 in total as in FIG. 9 (for example, one first part 31 and two second parts 32), the propagation velocity difference between the component propagating along the fast axis and the component propagating along the slow axis can be regarding the first bridge fiber 60 and the second bridge fiber 70 if the difference between the angle between the fast axis 60X1 of the first bridge fiber 60 and the fast axis 32X1 of the second part 32 at the connection point C6 and the angle between the fast axis 70X1 of the second bridge fiber 70 and the fast axis 32X1 of the second part 32 at the connection point C8 is 90 degrees. In addition, in that case, the propagation velocity difference between the component propagating along the fast axis and the component propagating along the slow axis can be compensated regarding the first part 41 and the first part 51 if the difference between the angle between the fast axis 60X1 of the first bridge fiber 60 and the fast axis 41X1 of the first part 41 at the connection point C7 and the angle between the fast axis 70X1 of the second bridge fiber 70 and the fast axis 51X1 of the first part 51 at the connection point C9 is 0 degrees. Meanwhile, when the first optical fiber 30 has an even number of first parts 31 and second parts 32 in total unlike in FIG. 9 (for example, two first parts 31 and two second parts 32), the propagation velocity difference between the component propagating along the fast axis and the component propagating along the slow axis can be compensated regarding the first bridge fiber 60 and the second bridge fiber 70 if the difference between the angle between the fast axis 60X1 of the first bridge fiber 60 and the fast axis 32X1 of the second part 32 at the connection point C6 and the angle between the fast axis 70X1 of the second bridge fiber 70 and the fast axis 32X1 of the second part 32 at the connection point C8 is 0 degrees. Also in that case, the propagation velocity difference between the component propagating along the fast axis and the component propagating along the slow axis can be compensated regarding the first part 41 and the first part 51 if the difference between the angle between the fast axis 60X1 of the first bridge fiber 60 and the fast axis 41X1 of the first part 41 at the connection point C7 and the angle between the fast axis 70X1 of the second bridge fiber 70 and the fast axis 51X1 of the first part 51 at the connection point C9 is 0 degrees.

An example of the first modification example will be described. Mode lock oscillation was performed by the fiber laser device 1A illustrated in FIG. 7. The fiber laser device 1A was configured to output laser light with a wavelength in the 1.5 μm band. The MFD of the first optical fiber 30 was approximately 4 μm. The length of the first optical fiber 30 was approximately 1.5 m. The MFDs of the second optical fiber 40 and the third optical fiber 50 were approximately 10.1 μm. The dispersion value of the entire resonator was −0.081 ps². When the first optical fiber 30 and the second optical fiber 40 were directly connected by fusion, the loss at the connection point was 0.8 dB. When the first bridge fiber 60 was connected between the first optical fiber 30 and the second optical fiber 40, the loss was 0.4 dB. From this, it can be seen that the loss at the connection point can be reduced by providing the first bridge fiber 60.

Figure 10:
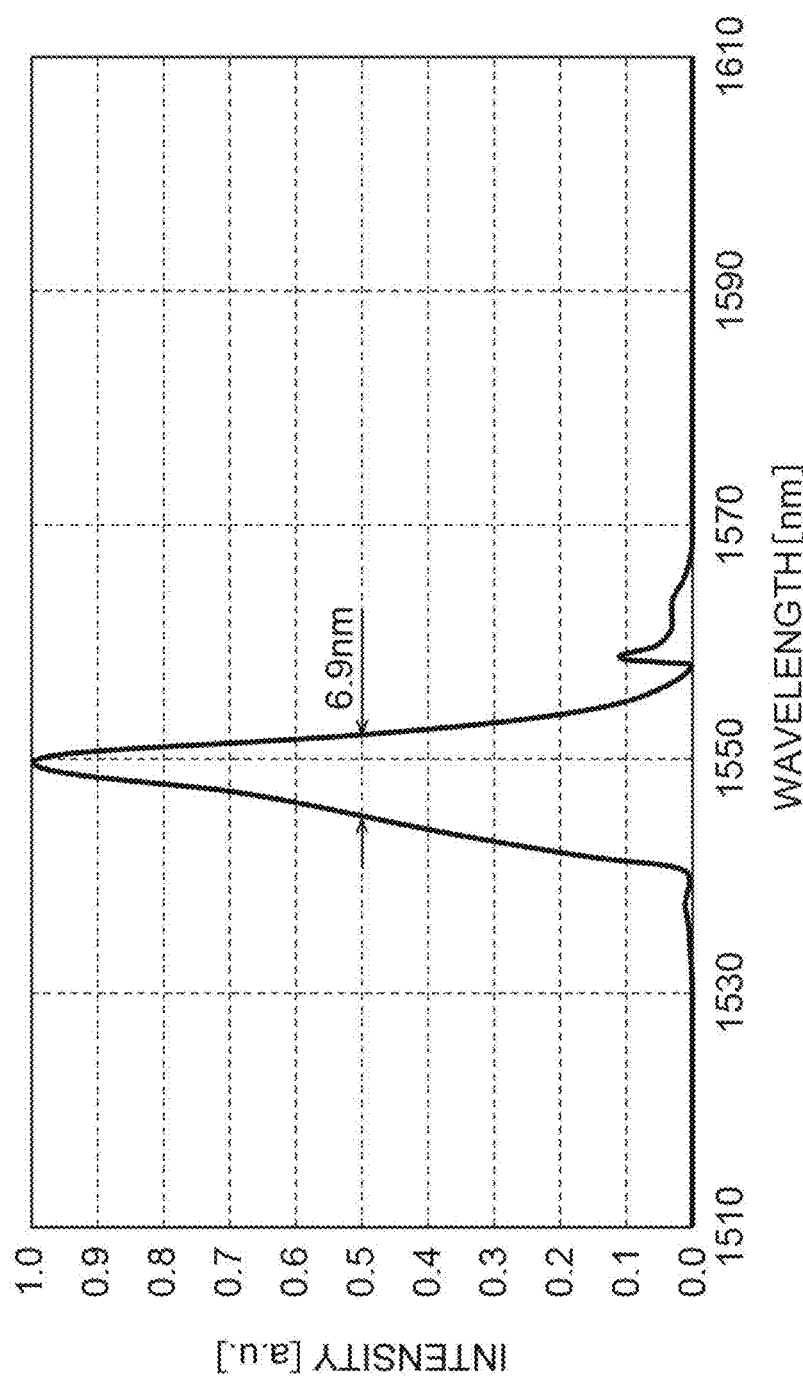
FIG. 10 is a graph illustrating a spectral waveform acquired by the configuration of FIG. 7.
Figure 11:
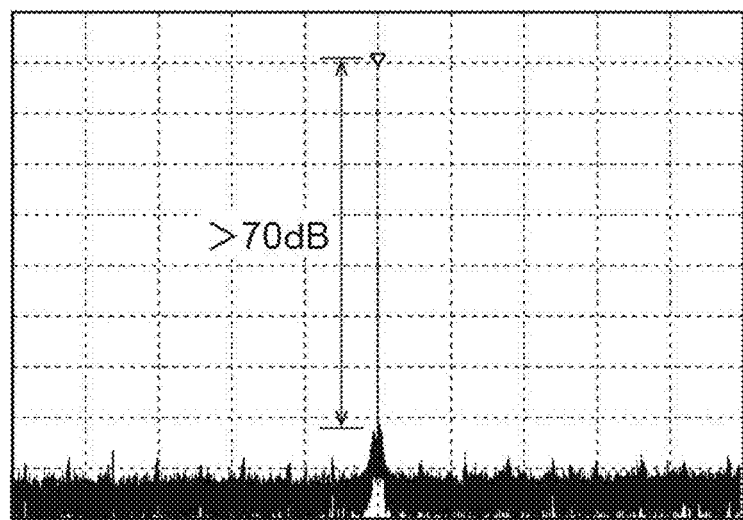
FIGS. 11(*a*) and 11(*b*) are graphs illustrating frequency spectra acquired by the configuration of FIG. 7.
Figure 11:
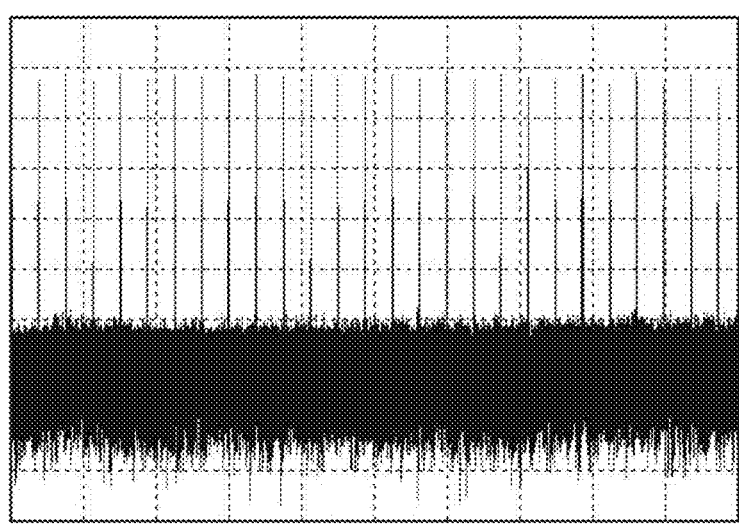

FIG. 10 is a graph illustrating a spectral shape, and FIGS. 11(a) and 11(b) are graphs illustrating frequency spectra. The scale interval of the horizontal axis is 200 kHz in FIG. 11(a) and 100 MHz in FIG. 11(b). In both graphs, the scale interval of the vertical axis is 10 dB. As illustrated in FIG. 10, the spectral width was 6.9 nm, and a sufficient spectral width was obtained. In FIG. 11(a), the repetition frequency of the output light was 36.1 MHz. The S/N ratio of the frequency spectrum of the output light was 70 dB or more. As illustrated in FIG. 11(b), the peak heights were uniform and sufficient frequency stability was obtained even when the band was widened to 1 GHz.

Comparative Example

Figure 12:
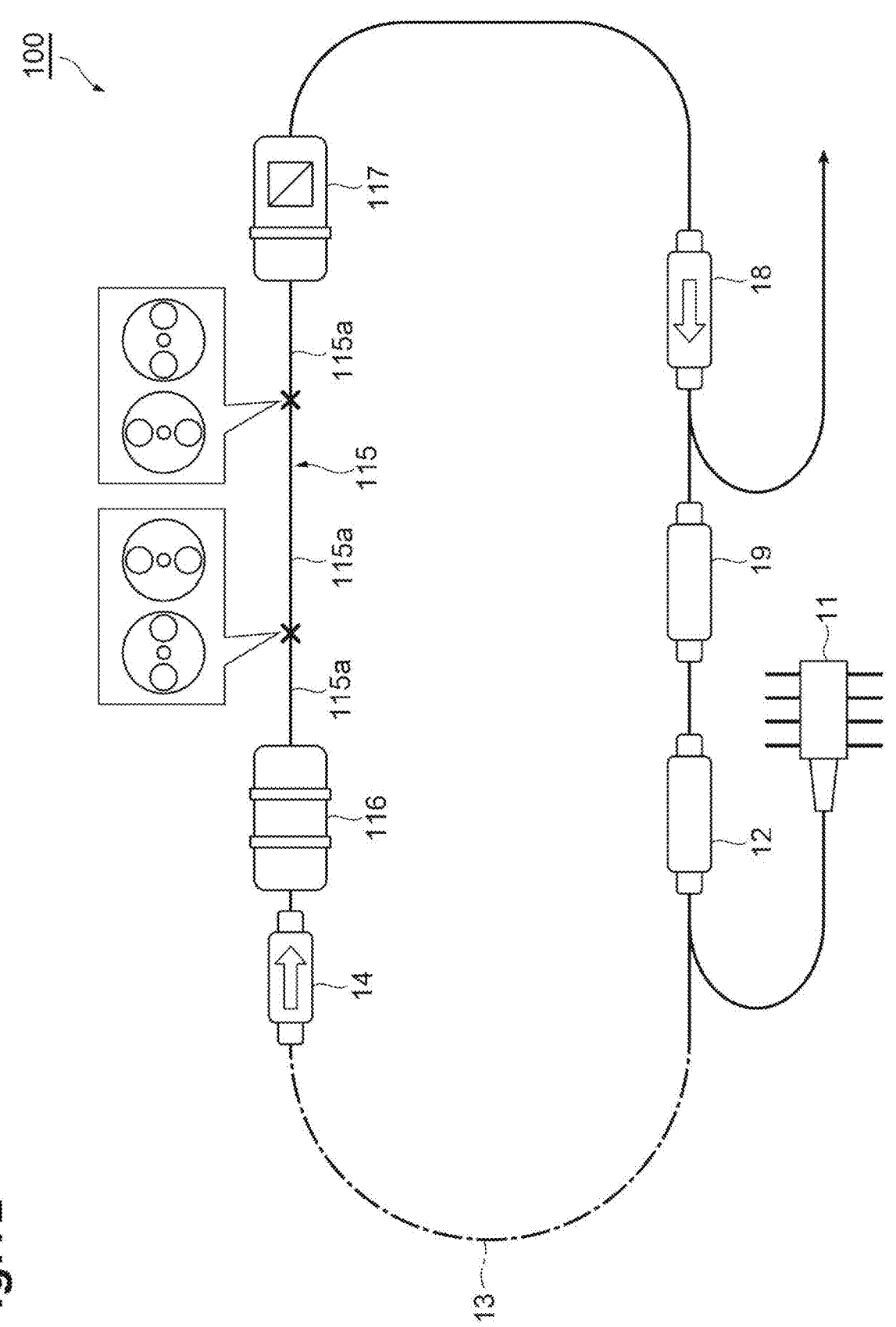
FIG. 12 is a configuration diagram of a fiber laser device of a comparative example.

In a fiber laser device 100 of the comparative example illustrated in FIG. 12, a mode lock portion 115 is made of three fiber elements 115a configured by polarization maintaining fibers with the same MFD. A polarization controller 116 is connected to one end of the mode lock portion 115, and a polarization controller 117 is connected to the other end of the mode lock portion 115. Similarly to the fiber laser device 1 of the embodiment, the fiber laser device 100 of the comparative example was configured such that laser light with a wavelength in the 1.5 μm band is output at a repetition frequency of approximately 40 MHz. The MFD of the fiber element 115a was approximately 10.1 μm. The total length of the mode lock portion 115 was approximately 2 m. The dispersion value of the entire resonator was –0.110 ps².

Figure 13:
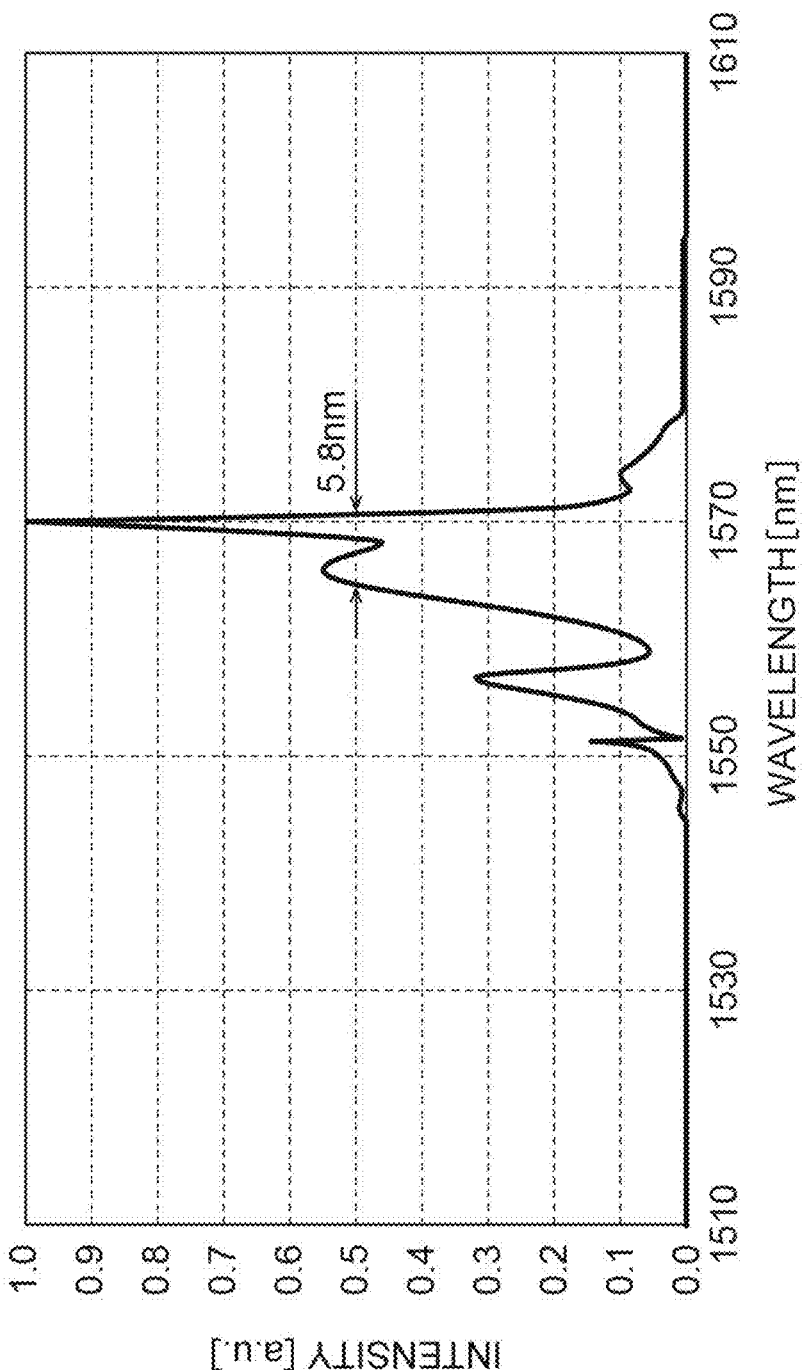
FIG. 13 is a graph illustrating a spectral waveform acquired by the configuration of FIG. 12.
Figure 14:
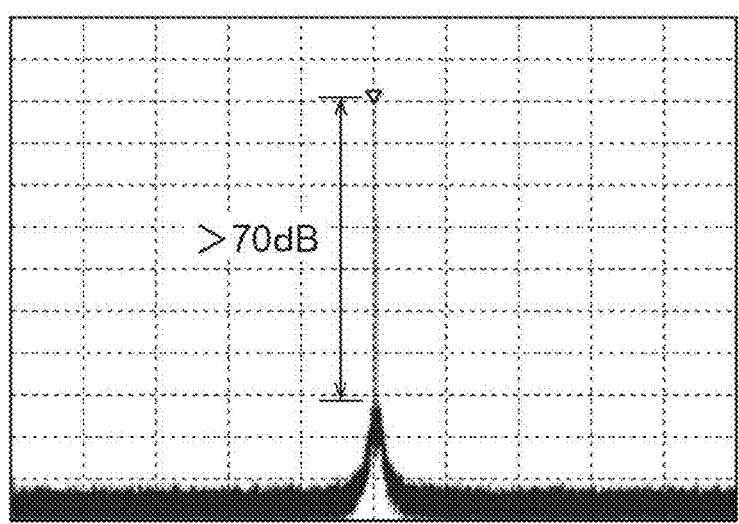
FIGS. 14(*a*) and 14(*b*) are graphs illustrating frequency spectra acquired by the configuration of FIG. 12.
Figure 14:
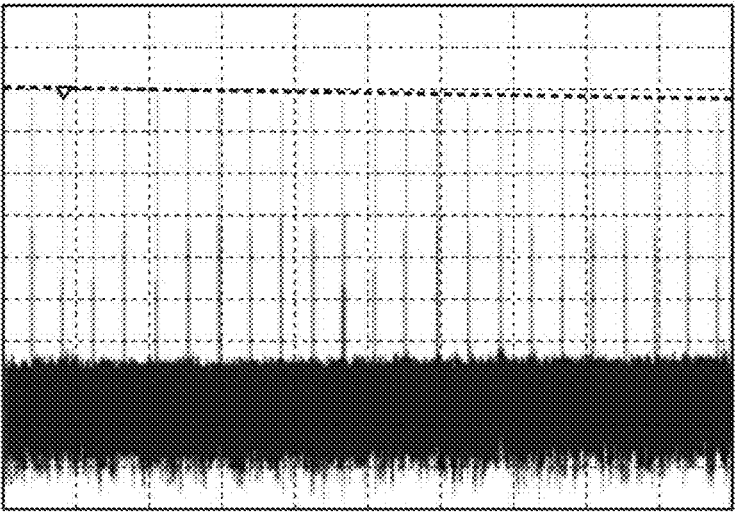

FIG. 13 is a graph illustrating a spectral shape, and FIGS. 14(a) and 14(b) are graphs illustrating frequency spectra. The scale interval of the horizontal axis is 200 kHz in FIG. 14(a) and 100 MHz in FIG. 14(b). In both graphs, the scale interval of the vertical axis is 10 dB. As illustrated in FIG. 13, the spectral width was 5.8 nm. In FIG. 14(a), the repetition frequency of the output light was 40.9 MHz. The S/N ratio of the frequency spectrum of the output light was 70 dB or more. As illustrated in FIG. 14(b), the peak heights were uniform and sufficient frequency stability was obtained even when the band was widened to 1 GHz.

As described above, in the fiber laser device 1 illustrated in FIG. 1, the excitation power at self-starting mode lock was approximately 105 mW. Meanwhile, in the fiber laser device 100 of the comparative example illustrated in FIG. 12, the excitation power at self-starting mode lock was approximately 225 mW. In this manner, when the conditions of both were the same and the repetition frequency was approximately 40 MHz at a fiber length of 2 m, in the fiber laser device 1 illustrated in FIG. 1, an ultrashort pulse laser could be oscillated with approximately half the excitation power of the fiber laser device 100 of the comparative example illustrated in FIG. 12.

Second Modification Example

Figure 15:
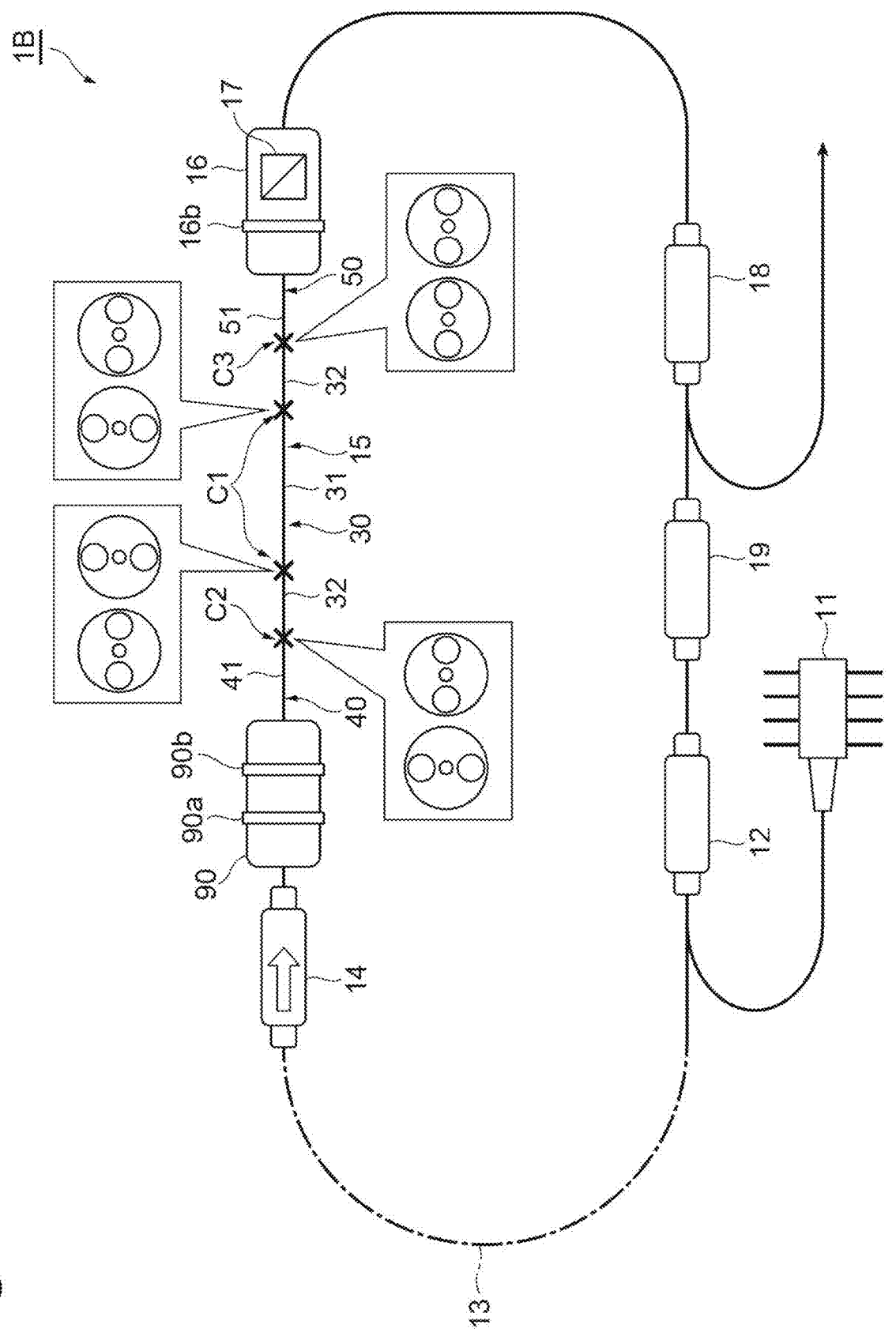
FIG. 15 is a configuration diagram of a fiber laser device of a second modification example.

In a fiber laser device 1B of a second modification example illustrated in FIG. 15, the polarization controller 90 is provided between the isolator 14 and the mode lock portion 15 as in the first modification example. The polarization controller 16 and the polarizer 17 are integrally configured as one element. The second optical fiber 40 has only the first part 41. One end of the first part 41 is connected to the second part 32 of the first optical fiber 30, and the other end of the first part 41 is connected to the polarization controller 90. According to the second modification example as well as the above embodiment, light with a satisfactory waveform can be output and high repetition rate and low excitation power can be achieved.

[Mode Lock Conditions]

The conditions under which mode lock occurs were confirmed using the configuration illustrated in FIG. 15. The angular region where mode lock occurs was confirmed while adjusting the polarization state of the light input to the second optical fiber 40 positioned on the most upstream side (hereinafter, also referred to as "entrance side fiber") using the polarization controller 90 and adjusting the polarization state of the light at the output end of the third optical fiber 50 positioned on the most downstream side (hereinafter, also referred to as "exit side fiber") using the polarization controller 16. It should be noted that the confirmation was performed with the excitation power enhanced for easier understanding of the angular region and the angle may deviate during actual operation.

Figure 16:
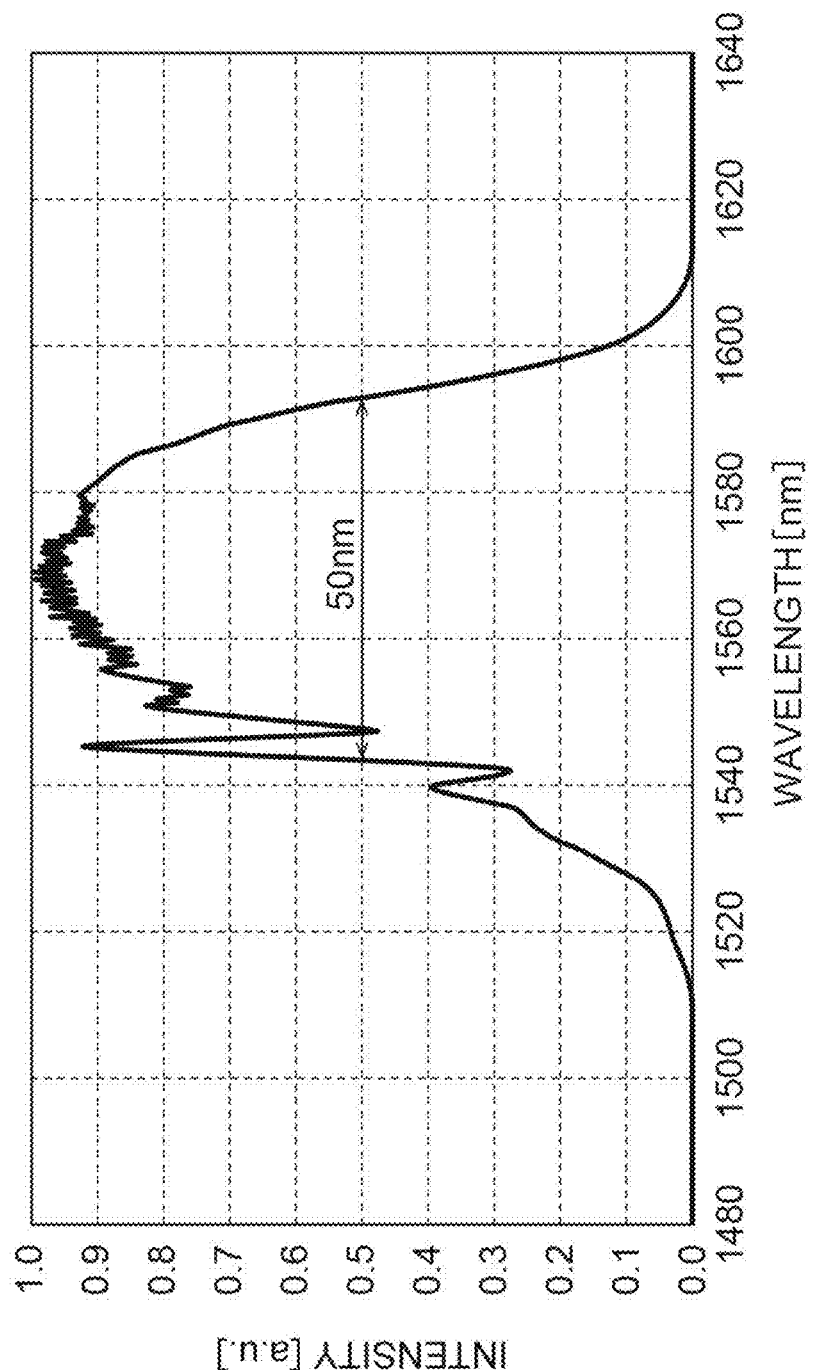
FIG. 16 is a graph illustrating a spectral waveform acquired by the configuration of FIG. 15.
Figure 17:
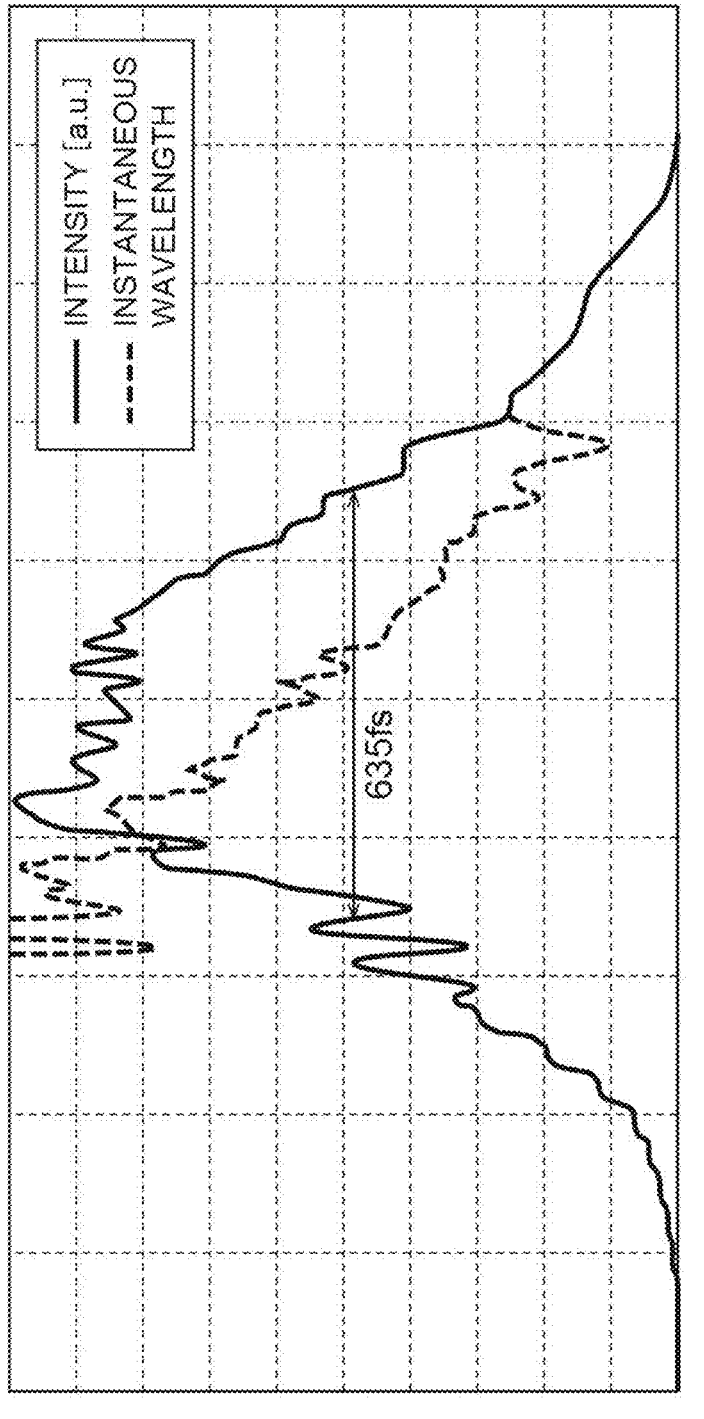
FIG. 17 is a graph illustrating a pulse waveform and an instantaneous wavelength acquired by the configuration of FIG. 15.

FIG. 16 is a graph illustrating a spectral shape, and FIG. 17 is a graph illustrating a pulse waveform and an instantaneous wavelength. FIGS. 16 and 17 illustrate the results of when the rotation angle of the entrance side fiber (angle between the fast axis and the slow axis) is 12 degrees (192 degrees) and the rotation angle of the exit side fiber is 100 degrees. As illustrated in FIG. 16, the spectral width was 50 nm. As illustrated in FIG. 17, the pulse width was 635 fs. In FIG. 17, the scale interval of the horizontal axis is 200 fs.

Figure 18:
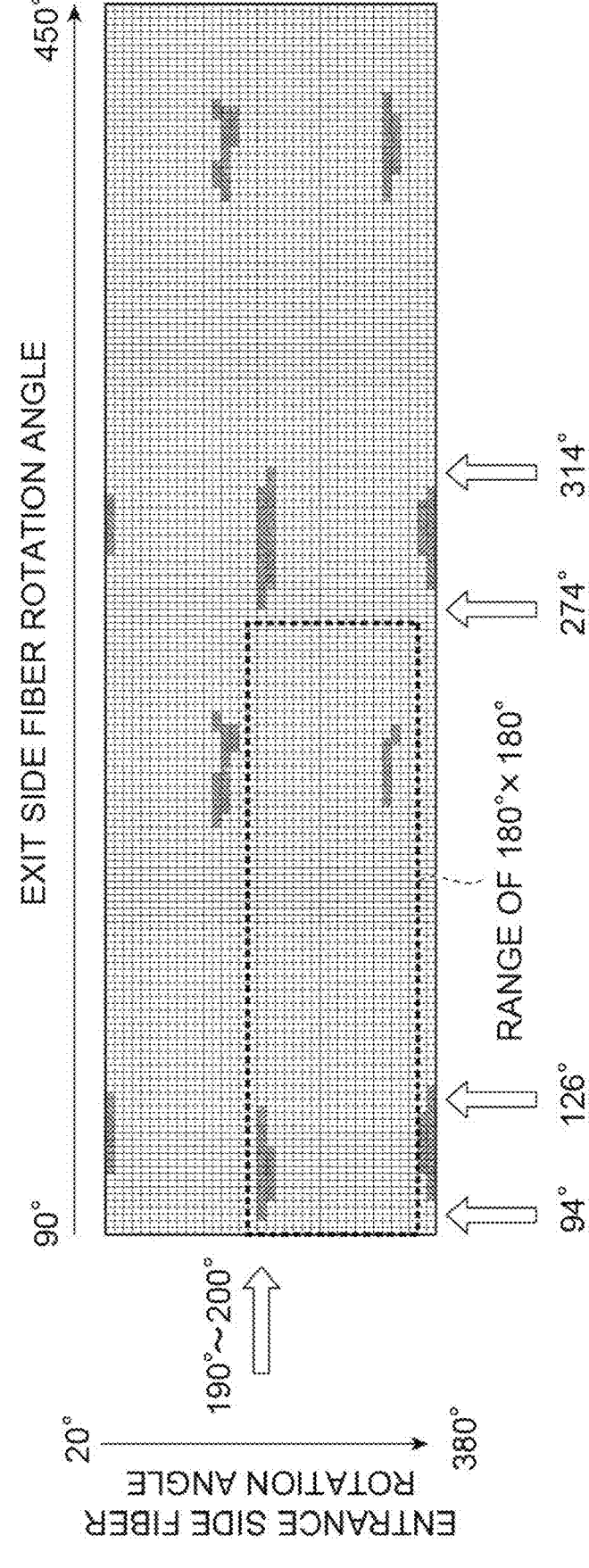
FIG. 18 is a diagram illustrating an angular region where mode lock has occurred in the configuration of FIG. 15.

FIG. 18 is a diagram illustrating angular regions where mode lock occurred. In FIG. 18, the scale interval of the vertical axis is 10 degrees, and the scale interval of the horizontal axis is 2 degrees. The colored regions indicate that mode lock occurred at the angle combinations corresponding to the regions. From FIG. 18, it can be seen that there is a region where mode lock occurs in the vicinity of the angular region where the angle obtained by adding 90 degrees to the rotation angle of the entrance side fiber is equal to the rotation angle of the exit side fiber. The rotation angles of the entrance side fiber and the exit side fiber can be set based on such experimental results. In addition, using the experimental results, the angles θ1 and θ2 at the connection points C3 and C4 described above can be set so as to cause mode lock.

Third Modification Example

Figure 19:
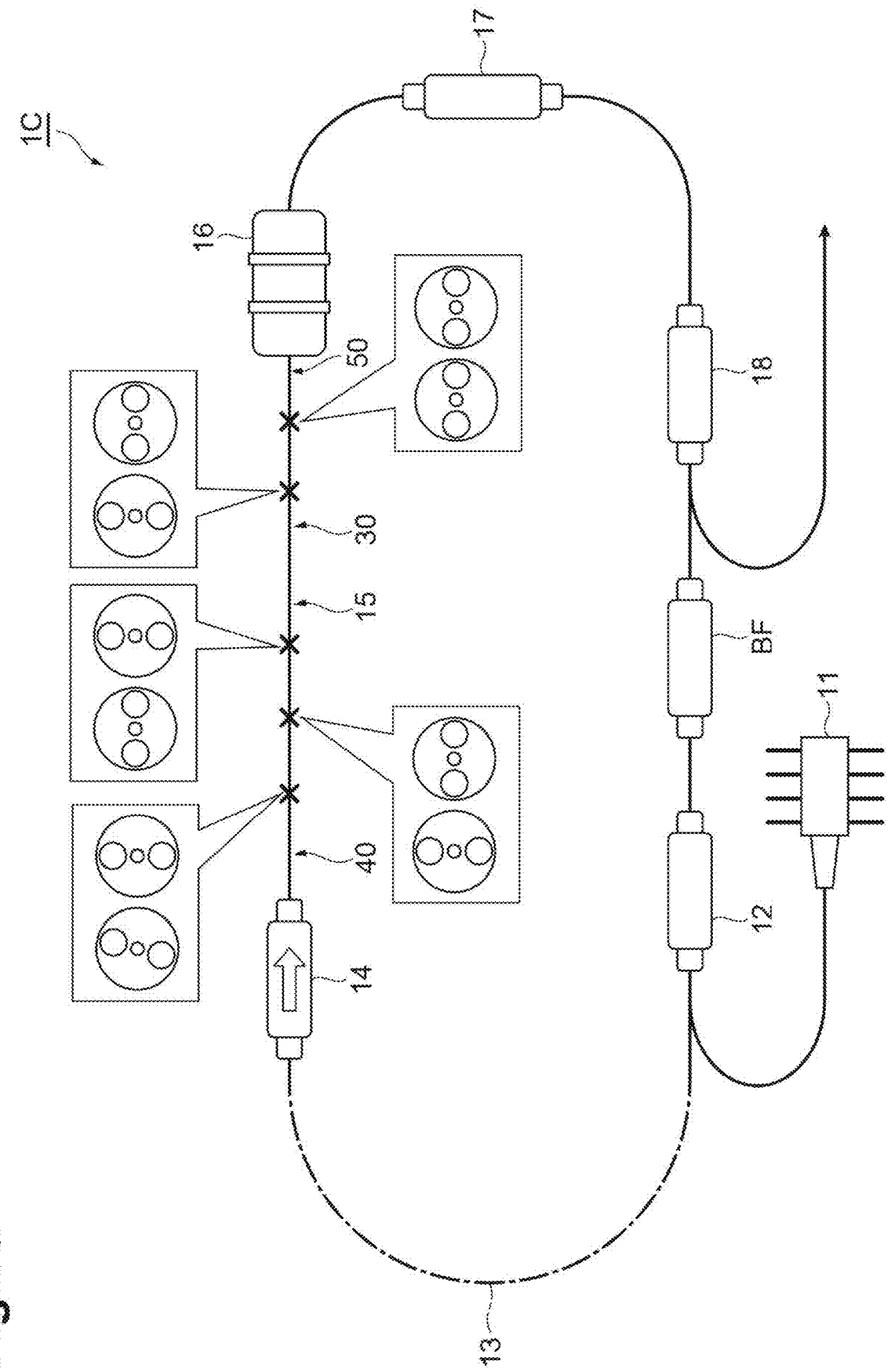
FIG. 19 is a configuration diagram of a fiber laser device of a third modification example.

A fiber laser device 1C of a third modification example illustrated in FIG. 19 is configured such that laser light with a wavelength in the 1.0 μm band is output. The MFD of the first optical fiber 30 was approximately 3.5 μm. The length of the first optical fiber 30 was approximately 6 m. The MFDs of the second optical fiber 40 and the third optical fiber 50 were approximately 6.9 μm. The dispersion value of the entire resonator was 0.304 ps². In the fiber laser device 1C, a bandpass filter BF is provided instead of the ASE filter 19. In outputting laser light in the 1.0 μm band, the dispersion value becomes normal dispersion and the pulse continues to spread, and thus the pulse spread needs to be limited by the bandpass filter BF. According to the third modification example as well as the above embodiment, light with a satisfactory waveform can be output and high repetition rate and low excitation power can be achieved.

Figure 20:
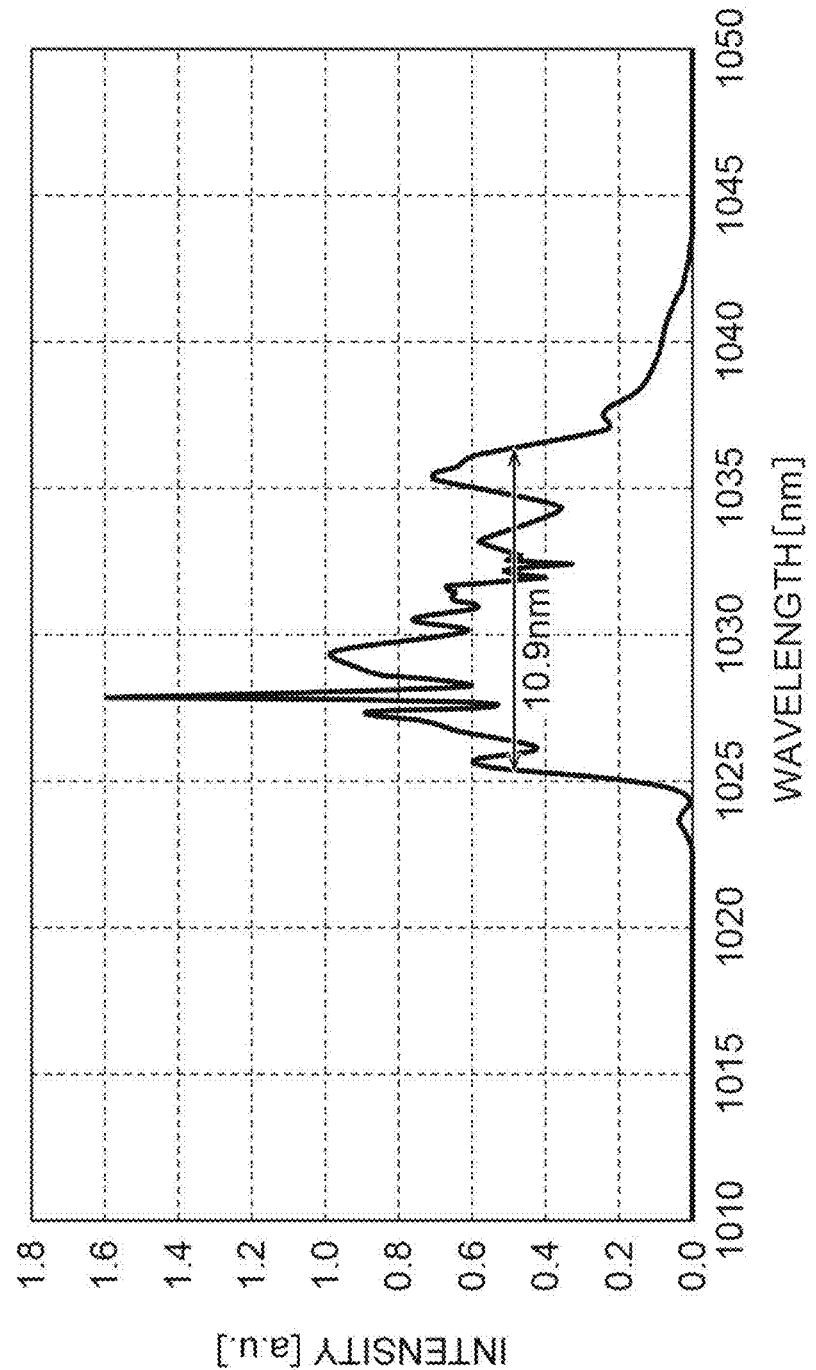
FIG. 20 is a graph illustrating a spectral waveform acquired by the configuration of FIG. 19.
Figure 21:
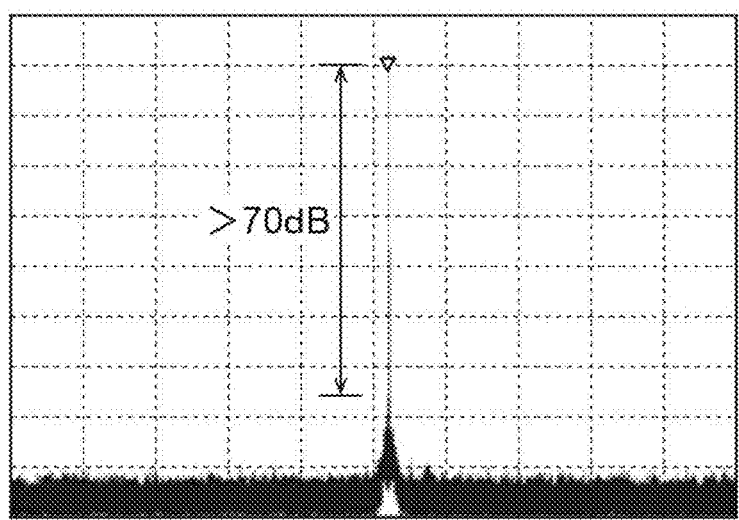
FIGS. 21(a) and 21(b) are graphs illustrating frequency spectra acquired by the configuration of FIG. 19.
Figure 21:
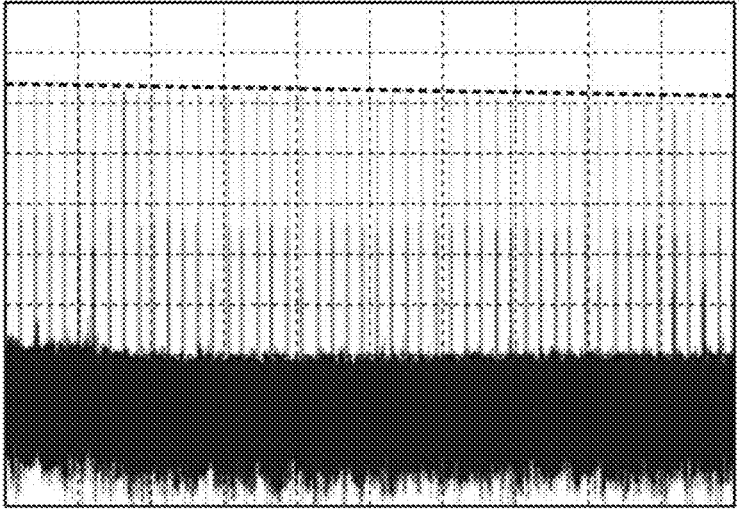

FIG. 20 is a graph illustrating a spectral shape, and FIGS. 21(a) and 21(b) are graphs illustrating frequency spectra. As illustrated in FIG. 20, the spectral width was 10.9 nm, and a sufficient spectral width was obtained. In FIG. 21(a), the repetition frequency of the output light was 19.9 MHz. The S/N ratio of the frequency spectrum of the output light was 70 dB or more. As illustrated in FIG. 21(*b*), the peak heights were uniform and sufficient frequency stability was obtained even when the band was widened to 1 GHz.

The present disclosure is not limited to the embodiment and modification examples described above. In the above embodiment, the second optical fiber 40 may have only the second part 42 and the second part 42 may be connected to the second part 32 of the first optical fiber 30 such that the angle between the fast axis 42X1 of the second part 42 and the fast axis 32X1 of the second part 32 is the angle θ1 other than 0 degrees or 90 degrees. Likewise, the third optical fiber 50 may have only the second part 52 and the second part 52 may be connected to the second part 32 such that the angle between the fast axis 52X1 of the second part 52 and the fast axis 32X1 of the second part 32 is the angle θ2 other than 0 degrees or 90 degrees.

In the above embodiment, the angle (first angle) between the fast axis 41X1 of the first part 41 and the fast axis 32X1 of the second part 32 at the connection point C2 is 90 degrees, and the angle (second angle) between the fast axis 51X1 of the first part 51 and the fast axis 32X1 of the second part 32 at the connection point C4 is 0 degrees. Conversely, the first angle may be 0 degrees and the second angle may be 90 degrees. In other words, it is sufficient that the first angle and the second angle are different from each other by 90 degrees. Also in this case, light with a satisfactory waveform can be output and high repetition rate and low excitation power can be achieved as in the above embodiment. In other words, in the above embodiment, the second optical fiber 40 can be regarded as the third optical fiber and the third optical fiber 50 can be regarded as the second optical fiber. Likewise, in the first modification example, the second optical fiber 40 can be regarded as the third optical fiber, the third optical fiber 50 can be regarded as the second optical fiber, the first bridge fiber 60 can be regarded as the second bridge fiber, and the second bridge fiber 70 can be regarded as the first bridge fiber.

The first optical fiber 30 may have two or more first parts 31. In this case, the plurality of first parts 31 and the plurality of second parts 32 are alternatively disposed (staggered). Also in this case, the first part 31 and the second part 32 adjacent to each other are connected to each other such that the fast axis 32X1 of the second part 32 coincides with the slow axis 31X2 of the first part 31 at a connection point. When the first optical fiber 30 has two or more first parts 31, the total length L31 of the first parts 31 is the sum of the respective lengths of the first parts 31. The first optical fiber 30 may have three or more second parts 32.

REFERENCE SIGNS LIST

1, 1A, 1B, 1C: fiber laser device, 11: light source, 30: first optical fiber, 31: first part, 32: second part, 40: second optical fiber, 41: first part, 42: second part, 50: third optical fiber, 51: first part, 52: second part, 60: first bridge fiber, 70: second bridge fiber, L1: excitation light, 31X1, 32X1, 41X1, 42X1, 51X1, 52X1, 60X1, 70X1, X1: fast axis, 32X2, X2: slow axis, C1, C2, C4, C6, C8: connection point, θ1, θ2: angle.

The invention claimed is:

1. A fiber laser device comprising:
a first optical fiber configured by a polarization maintaining fiber;
a second optical fiber configured by a polarization maintaining fiber and connected to one end of the first optical fiber; and a third optical fiber configured by a polarization maintaining fiber and connected to the other end of the first optical fiber, wherein
the first optical fiber includes at least one first part and at least two second parts alternatively disposed with the first part,
the first part and the second part adjacent to each other are connected to each other such that a fast axis of the first part coincides with a slow axis of the second part at a connection point,
a total length of the first part is equal to a total length of the second parts, and
a mode field diameter of the first optical fiber is smaller than each of a mode field diameter of the second optical fiber and a mode field diameter of the third optical fiber.

2. The fiber laser device according to claim 1, wherein at least one of the second optical fiber and the third optical fiber is connected to the first optical fiber by fusion.

3. The fiber laser device according to claim 1, wherein the second optical fiber includes a first part and a second part,
the first part of the second optical fiber is connected to the one end of the first optical fiber such that a fast axis of the first part of the second optical fiber coincides with a slow axis of the first optical fiber at a connection point, and
the second part of the second optical fiber is connected to the first part of the second optical fiber such that an angle between a fast axis of the second part of the second optical fiber and a fast axis of the first part of the second optical fiber is an angle other than 0 degrees or 90 degrees at a connection point.

4. The fiber laser device according to claim 3, wherein the third optical fiber includes a first part and a second part,
the first part of the third optical fiber is connected to the other end of the first optical fiber such that a fast axis of the first part of the third optical fiber coincides with a fast axis of the first optical fiber at a connection point, and
the second part of the third optical fiber is connected to the first part of the third optical fiber such that an angle between a fast axis of the second part of the third optical fiber and a fast axis of the first part of the third optical fiber is an angle other than 0 degrees or 90 degrees at a connection point.

5. The fiber laser device according to claim 4, wherein a length of the first part of the second optical fiber is equal to a length of the first part of the third optical fiber.

6. The fiber laser device according to claim 1, wherein the second optical fiber includes a first part,
the first part of the second optical fiber is connected to the one end of the first optical fiber such that a fast axis of the first part of the second optical fiber coincides with a slow axis of the first optical fiber at a connection point,
the third optical fiber includes a first part,
the first part of the third optical fiber is connected to the other end of the first optical fiber such that a fast axis of the first part of the third optical fiber coincides with a fast axis of the first optical fiber at a connection point, and
a length of the first part of the second optical fiber is equal to a length of the first part of the third optical fiber.

7. The fiber laser device according to claim 1, further comprising a first bridge fiber configured by a polarization maintaining fiber and connected between the first optical fiber and the second optical fiber, wherein a mode field diameter of the first bridge fiber is larger than the mode field diameter of the first optical fiber and smaller than the mode field diameter of the second optical fiber.

8. The fiber laser device according to claim 7, further comprising a second bridge fiber configured by a polarization maintaining fiber and connected between the first optical fiber and the third optical fiber, wherein a mode field diameter of the second bridge fiber is larger than the mode field diameter of the first optical fiber and smaller than the mode field diameter of the third optical fiber.

9. The fiber laser device according to claim 8, wherein the first optical fiber includes an even number of the first and second parts in total, and a difference between an angle between a fast axis of the first bridge fiber and a fast axis of the first optical fiber at a connection point and an angle between a fast axis of the second bridge fiber and a fast axis of the first optical fiber at a connection point is 90 degrees.

10. The fiber laser device according to claim 8, wherein the first optical fiber includes an odd number of the first and second parts in total, and a difference between an angle between a fast axis of the first bridge fiber and a fast axis of the first optical fiber at a connection point and an angle between a fast axis of the second bridge fiber and a fast axis of the first optical fiber at a connection point is 0 degrees.

11. The fiber laser device according to claim 9, wherein a difference between an angle between a fast axis of the first bridge fiber and a fast axis of the second optical fiber at a connection point and an angle between a fast axis of the second bridge fiber and a fast axis of the third optical fiber at a connection point is 0 degrees.

12. The fiber laser device according to claim 8, wherein a length of the first bridge fiber is equal to a length of the second bridge fiber.

13. The fiber laser device according to claim 1, further comprising:

a light source that outputs excitation light; and an optical fiber that absorbs the excitation light and emits laser light, wherein the laser light is guided by the first optical fiber, the second optical fiber, and the third optical fiber.

* * * * *